United States Patent
Oofusa et al.

(10) Patent No.: US 7,582,246 B2
(45) Date of Patent: Sep. 1, 2009

(54) TRANSFERRING AND MOLDING METHOD AND TRANSFERRING AND MOLDING APPARATUS

(75) Inventors: Masaatsu Oofusa, Toyama (JP); Shigeru Imai, Namerikawa (JP); Toshiaki Higuchi, Kurobe (JP); Yutaka Hagiwara, Namerikawa (JP); Kunio Miyazaki, Uozu (JP); Naoto Toyooka, Kyoto (JP); Tadahiro Itoh, Kyoto (JP)

(73) Assignees: YYK Corporation, Tokyo (JP); Nissha Printing Co., Ltd., Kyoto (JP)

( * ) Notice: Subject to any disclaimer, the term of this patent is extended or adjusted under 35 U.S.C. 154(b) by 712 days.

(21) Appl. No.: 10/546,526

(22) PCT Filed: Mar. 3, 2004

(86) PCT No.: PCT/JP2004/002628

§ 371 (c)(1),
(2), (4) Date: Aug. 23, 2005

(87) PCT Pub. No.: WO2004/078452

PCT Pub. Date: Sep. 16, 2004

(65) Prior Publication Data

US 2006/0172025 A1    Aug. 3, 2006

(30) Foreign Application Priority Data

Mar. 3, 2003   (JP)   ............................. 2003-055705

(51) Int. Cl.
B29C 45/76    (2006.01)
(52) U.S. Cl. .................. 264/328.1; 264/40.1; 264/241; 425/135; 425/542
(58) Field of Classification Search ........................ None
See application file for complete search history.

(56) References Cited

U.S. PATENT DOCUMENTS

| 5,082,435 | A | 1/1992 | Kuramitsu et al. |
| 5,914,170 | A | 6/1999 | Rabe et al. |
| 6,071,456 | A | 6/2000 | Hanamoto et al. |
| 6,497,567 | B1 | 12/2002 | Eschenfelder et al. |

FOREIGN PATENT DOCUMENTS

EP   0 101 095   2/1984

(Continued)

OTHER PUBLICATIONS

Machine Translation of JP 2004-098514.*

(Continued)

Primary Examiner—Monica A Huson
(74) Attorney, Agent, or Firm—Wenderoth, Lind & Ponack, LLP.

(57) ABSTRACT

Provided is a transferring and molding method capable of forming a molded article on which a pattern is transferred in a prescribed position by automatically correcting a shift when there is produced a molded article on which the pattern is transferred with a shift. When the pattern of a molded article has a shift, the shift dimension and the shift direction of the pattern of the molded article are detected as digital values, and positional correction is carried out by automatically moving the transfer film by the detected shift dimension toward the side opposite from the detected shift direction. Thereafter, the pattern is transferred in the prescribed position of the molded article that has undergone the transferring, and molding is carried out.

15 Claims, 12 Drawing Sheets

FOREIGN PATENT DOCUMENTS

| | | |
|---|---|---|
| EP | 0 822 048 | 2/1998 |
| JP | 59-031130 | 2/1984 |
| JP | 62-187006 | 8/1987 |
| JP | 1-59095 | 12/1989 |
| JP | 4-158015 | 6/1992 |
| JP | 4-363217 | 12/1992 |
| JP | 5-154869 | 6/1993 |
| JP | 6-24741 | 4/1994 |
| JP | 7-55516 | 6/1995 |
| JP | 7-178767 | 7/1995 |
| JP | 10-44183 | 2/1998 |
| JP | 2001-105451 | 4/2001 |
| JP | 2001-198944 | 7/2001 |
| JP | 2002-198386 | 7/2002 |
| JP | 2004-098514 | 4/2004 |

OTHER PUBLICATIONS

Supplementary European Search Report issued Feb. 13, 2009 in EP 04 71 6748, which is a foreign counterpart to the present application.

* cited by examiner

TRANSFERRING AND MOLDING METHOD AND TRANSFERRING AND MOLDING APPARATUS

TECHNICAL FIELD

The present invention relates to a transferring and molding method and transferring and molding apparatus, which places a transfer film between dies and transfers a pattern provided on the transfer film onto a molded article concurrently with molding.

BACKGROUND ART

The transferring and molding apparatus disclosed in Japanese Examined Patent Publication No. 01-59095 is known.

This transferring and molding apparatus includes a movable die mounted on a movable platen, a stationary die mounted on a stationary platen, an injection nozzle, a transfer film, a film feeding unit mounted above the movable platen so as to move in a widthwise direction of the transfer film, a film winding unit mounted below the movable platen so as to move in a widthwise direction of the transfer film, and a position detecting unit for the transfer film.

The transfer film is moved in a lengthwise direction with the dies open, and stopped at the transfer transfer position when the position detecting unit has detected the position of the transfer film, after which a molten resin is injected from the injection nozzle with the dies closed so as to hold the transfer film therebetween, to transfer the pattern provided on the transfer film onto a molded article concurrently with the molding, and to thereby produce a molded article having the pattern transferred from the transfer film at a predetermined position.

In the aforementioned transferring and molding apparatus, the transfer film is positioned in the transfer position as follows.

More specifically, the position detecting unit is provided including a lengthwise direction sensor that detects a lengthwise direction mark of the transfer film, and first and second widthwise direction sensors that detect a widthwise direction mark of the transfer film, all of which are optical sensors. For the lengthwise positioning, the transfer film is moved lengthwise until the lengthwise direction sensor detects the lengthwise direction mark of the transfer film, at which point the film feeding unit and the film winding unit stop the movement of the transfer film.

For the widthwise positioning, the film feeding unit is moved widthwise with respect to the transfer film until the first widthwise direction sensor detects the widthwise direction mark of the transfer film, and the film winding unit is moved widthwise with respect to the transfer film until the second widthwise direction sensor detects the widthwise direction mark of the film, and once the first and the second widthwise direction sensors have detected the widthwise direction mark, the film feeding unit and the film winding unit are stopped.

That is, the transferring and molding method with the transferring and molding apparatus is a method for repeating the transferring and molding processes of positioning the transfer film in the transfer position by moving the transfer film in the die open state, thereafter placing the transfer film in the die closed state and then injecting the molten resin into the cavity for the transfer of the pattern of the transfer film in the prescribed position of the molded article concurrently with molding.

The conventional transferring and molding method has a process for positioning the transfer film in the transfer position so as to make the pattern of the transfer film position face the prescribed position of the die (molding section). Even through this process, the pattern transferred onto the molded article is sometimes shifted as a consequence of repetitively carrying out the aforementioned transferring and molding process.

For example, when wrinkles occur on the transfer film during the transferring and molding, a pattern shift occurs. The wrinkles of the transfer film are prominently created especially when the configuration of the molded article is bent in a convex shape in placing the transfer film between the dies or when a plurality of molding sections are formed on the die.

As described above, since the positioning of the transfer film is performed based on the position of the lengthwise direction mark and widthwise direction mark provided on the transfer film in the conventional transferring and molding method, the position of the transferred pattern is often shifted while repeating the transferring and molding process. Such a position shift can be corrected by correcting the transfer position for the transfer film; however, the transferring and molding process has to be suspended for the repositioning of the transfer film.

The present invention is made in view of the aforementioned problems, and the object thereof is to provide a transferring and molding method and transferring and molding apparatus capable of producing a molded article on which a pattern is transferred in a prescribed position by automatically correcting the position of a transfer film when there is produced a molded article on which the transferred pattern is shifted.

SUMMARY OF INVENTION

According to a first aspect of the present invention, there is provided a transferring and molding method comprising:

executing transferring and molding by positioning a transfer position of a transfer film by moving the transfer film in a lengthwise direction of the transfer film that has a pattern and at least one of a lengthwise direction mark and a widthwise direction mark, holding the transfer film between a stationary die and a movable die, and transferring the pattern onto a molded article concurrently with injection molding of a molten resin into a cavity located between both the dies closed with respect to each other for forming the molded article;

obtaining a first digital value by detecting a shift dimension and a shift direction of the pattern of the molded article that has undergone the transferring and molding;

obtaining an amount of shift of the mark in form of a second digital value;

obtaining a correction value and direction for correcting a transfer position of the transfer film, from both the first and second digital values; and carrying out correction with film movement of the transfer film based on the correction value and direction.

According to a second aspect of the present invention, there is provided the transferring and molding method as defined in the first aspect, and wherein:

obtaining the second digital value includes utilizing a laser line sensor for detection, and obtaining position information of the transfer film located in the transfer position, according to a shielding ratio of the mark provided on the transfer film located in the transfer position with respect to the laser line sensor; and obtaining the correction value and direction includes calculating the shielding ratio of the mark provided on the transfer film located on a presumed position where the transfer film is to be located after the correction, with respect to the laser line sensor.

According to a third aspect of the present invention, there is provided the transferring and molding method as defined in the first aspect, and wherein:

obtaining the first digital value includes generating an image of the molded article, and obtaining based on the image the shift amount and the shift direction between the actual position of the pattern transferred onto the molded article and a reference position where the pattern is supposed to be.

According to a fourth aspect of the present invention, there is provided the transferring and molding method as defined in one of the first aspect to the third aspect, further comprising:

after the correction, executing transferring and molding by positioning another transfer position of the transfer film by moving the transfer film in the lengthwise direction of the transfer film, holding the transfer film between the stationary die and the movable die, and transferring the pattern onto another molded article concurrently with injection molding of the molten resin into the cavity of both the dies closed with respect to each other for forming the another molded article;

obtaining a third digital value by detecting again a shift dimension and a shift direction of the pattern of the another molded article that has undergone the transferring and molding;

when the detected third digital value is outside a preset tolerance range, obtaining an amount of shift of the mark in a form of a fourth digital value;

obtaining a correction value and direction for correcting a transfer position of the transfer film, from both the third and fourth digital values; and repeating the correction and the transferring and molding until the third digital value falls within the tolerance range.

According to a fifth aspect of the present invention, there is provided a transferring and molding apparatus comprising:

an injection molding section for executing a transferring and molding operation by putting a stationary die and a movable die into a die closed state and a die open state and for injecting a molten resin into a cavity of both the dies in the die closed state to form a molded article concurrently with transferring onto the molded article a pattern of a transfer film which has the pattern to be transferred onto the molded article and at least one of a lengthwise direction mark and a widthwise direction mark;

a transfer film moving section for moving and positioning the transfer film in a lengthwise direction thereof with respect to a die parting surface of the die of the injection molding section before the transferring and molding operation and for moving the transfer film in at least one of the lengthwise direction and a widthwise direction of the transfer film during positional correction;

a pattern detection section for obtaining a first digital value by detecting a shift dimension and a shift direction of the pattern of the molded article that has undergone the transferring and molding operation; and a sensor section for obtaining an amount of shift of the mark in a form of a second digital value, wherein the transfer film is moved in at least one of a lengthwise direction and a widthwise direction of the transfer film by the transfer film moving section based on a correction value and direction which are obtained from both the first and second digital values.

According to a sixth aspect of the present invention, there is provided the transferring and molding apparatus as defined in the fifth aspect, and wherein:

the transfer film moving section includes a film feeding unit that feeds the transfer film in a lengthwise direction thereof into between the stationary die and the movable die, a film winding unit that winds thereon the transfer film delivered from the film feeding unit, a first moving mechanism that movably supports the film feeding unit in a widthwise direction of the transfer film, and a second moving mechanism that movably supports the film winding unit in a widthwise direction of the transfer film.

According to a seventh aspect of the present invention, there is provided the transferring and molding apparatus as defined in the fifth aspect, and wherein:

the sensor section includes a laser line sensor, so as to detect a shielding ratio of the mark provided on the transfer film located in the transfer position with respect to the laser line sensor and to thereby obtain the second digital value representing the position information of the transfer film located on the transfer position, and the correction value and direction is obtained in a form of the shielding ratio of the mark provided on the transfer film located on a presumed position where the transfer film is to be located after the correction, with respect to the laser line sensor.

According to an eighth aspect of the present invention, there is provided the transferring and molding apparatus as defined in the fifth aspect, and wherein:

the pattern detection section generates an image of the molded article, and obtains based on the image the shift amount and the shift direction between the actual position of the pattern transferred onto the molded article and a reference position where the pattern is supposed to be.

According to a ninth aspect of the present invention, there is provided the transferring and molding apparatus as defined in one of the fifth aspect to eighth aspect, and wherein:

the injection molding section moves, after the correction, the transfer film in a lengthwise direction thereof to determine another transfer position, and injects the molten resin into the cavity defined by the stationary die and the movable die closed with respect to each other with the transfer film held therebetween, so as to transfer the pattern onto another molded article concurrently with the molding;

the pattern detection section detects a shift dimension and shift direction of the pattern of another molded article that has undergone the transferring and molding process so as to obtain a third digital value;

the sensor section obtains a fourth digital value representing the shift amount of the mark, when the detected third digital value falls outside a predetermined tolerance range; and the transfer film moving section repetitively moves the transfer film for correction until the third digital value falls inside the tolerance range, based on the value and the direction to be corrected, with respect to the transfer position of the transfer film obtained from the third and the fourth digital values.

According to a tenth aspect of the present invention, there is provided the transferring and molding apparatus as defined in the fifth aspect, further comprising:

a storage unit that stores a plurality of first digital values obtained from a plurality of detections of the shift dimension and the shift direction performed by the pattern detection section; and an average calculation section that calculates the average value of the plurality of first digital values stored in the storage unit;

wherein the transfer film is moved based on the correction value and direction with respect to the transfer position of the transfer film obtained from the average value and the second digital value.

According to the present invention, when the pattern of the molded article is shifted, the transfer film is automatically moved by the shift dimension in the opposite direction to the shift direction. Therefore, the pattern is transferred at the predetermined position on the molded article that subsequently undergoes the transferring and molding process.

Consequently, when a molded article on which the position of the transferred pattern is shifted is produced, the position of the transfer film is automatically corrected so that the pattern is transferred at the predetermined position, which eliminates the need to suspend the transferring and molding process and maintains high accuracy in positioning of the pattern to be transferred onto the molded article.

Further, according to the present invention, the shift is detected again after the positional correction of the transfer film, and the positional correction is repeated again when there is a shift outside the tolerance range. Therefore, the position of the transfer film can be corrected into the tolerance range, by performing the transferring and molding process after the positional correction.

Further, since the transfer position of the pattern is only slightly different among the molded articles produced through successive transferring and molding process, it is possible to store the first digital value and to perform the positional correction of the transfer film based on an average value thereof, to thus correct the position shift of the pattern in high accuracy over an entirety of the successive transferring and molding process.

BRIEF DESCRIPTION OF DRAWINGS

These and other aspects and features of the present invention will become clear from the following description taken in conjunction with the preferred embodiments thereof with reference to the accompanying drawings, in which.

DETAILED DESCRIPTION OF THE INVENTION

Figure 1:
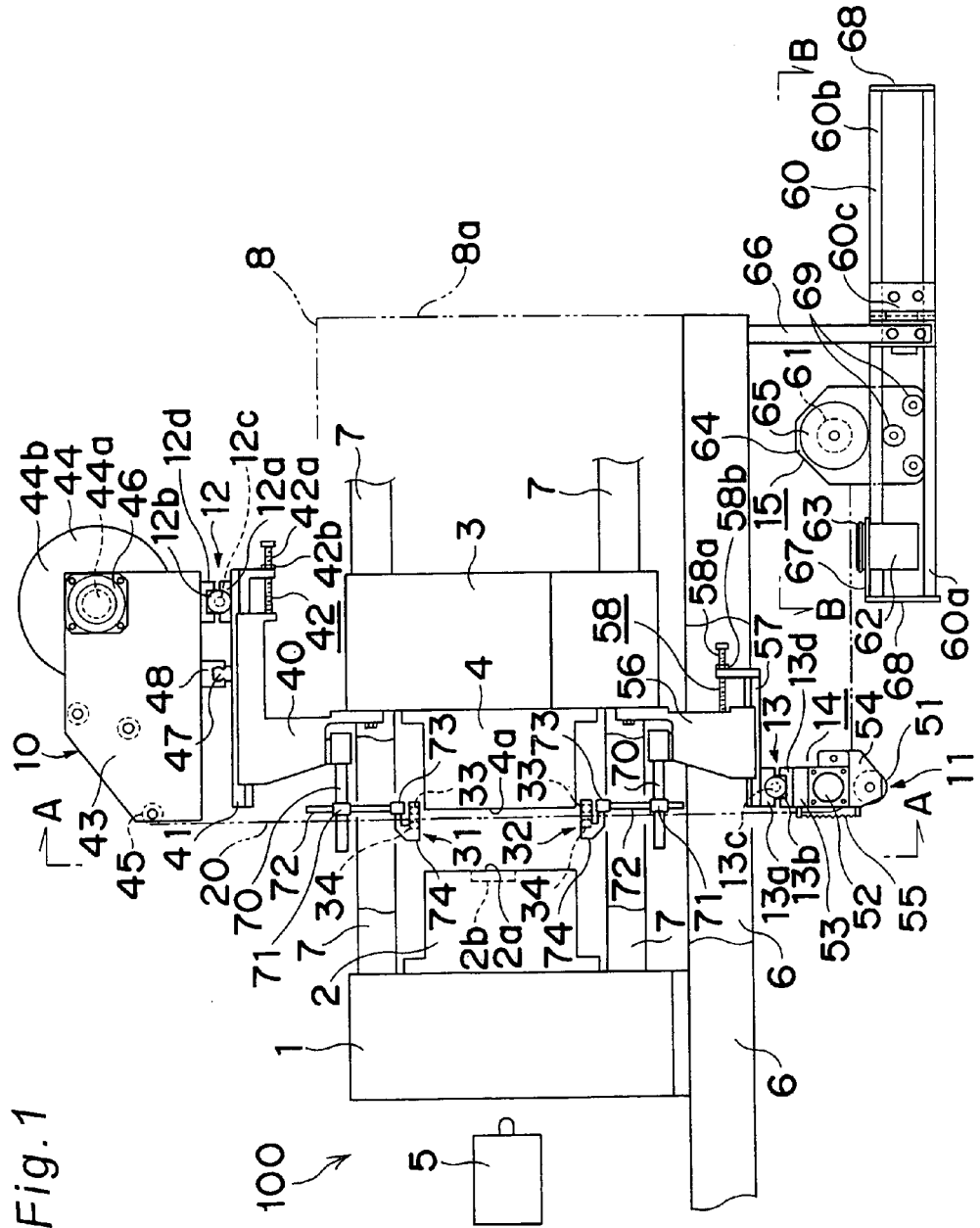
FIG. 1 is a side view of a transferring and molding apparatus according to a first embodiment of the present invention.

Before proceeding with the description of the present invention, it is to be noted that the same components are given identical reference numerals throughout the accompanying drawings.

Figure 2:
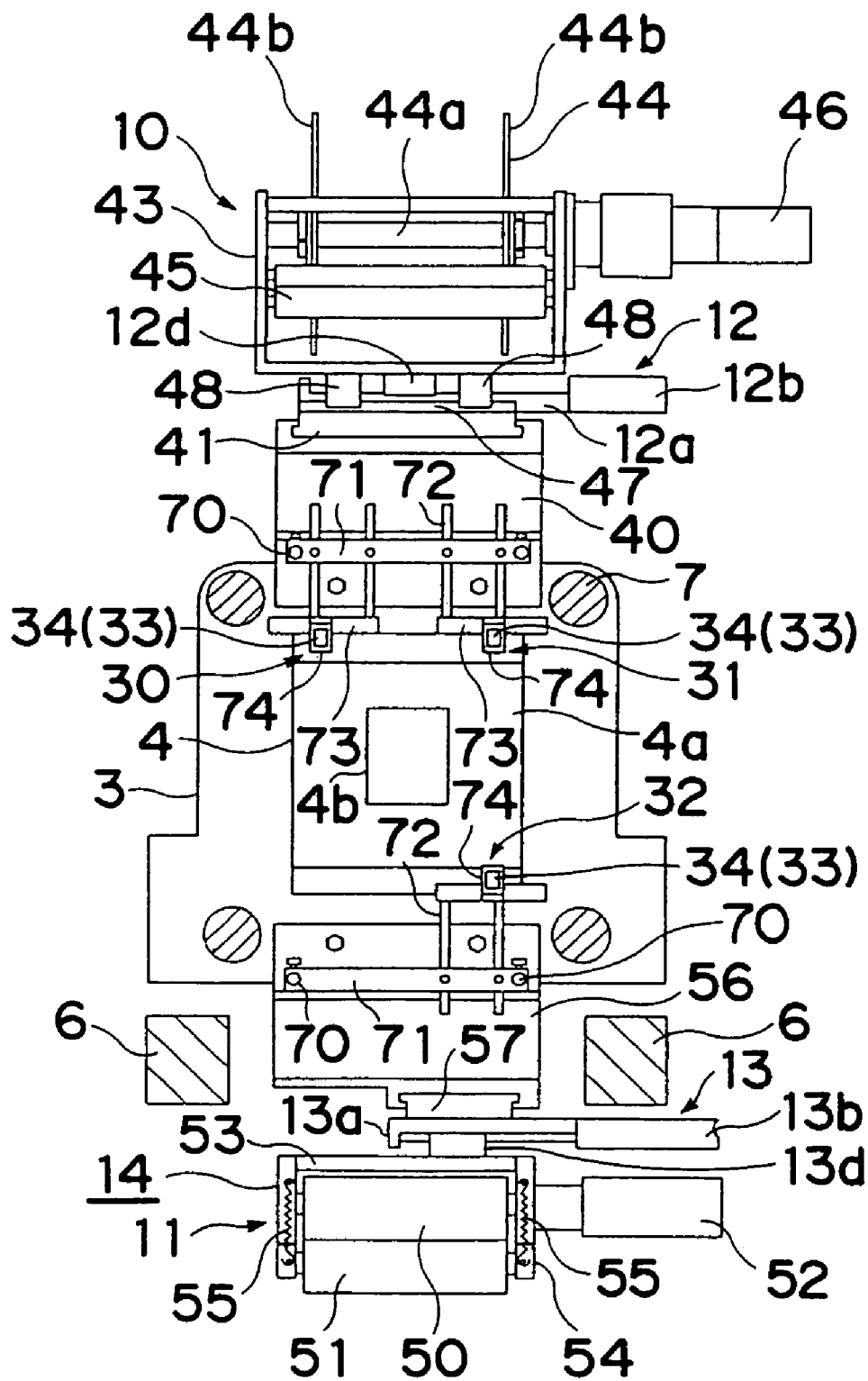
FIG. 2 is a sectional view taken along the line A-A of FIG. 1.

As shown in FIGS. 1 and 2, an injection molding section 100 includes a stationary die 2 mounted on a stationary platen 1, a movable die 4 mounted on a movable platen 3, and an injection nozzle 5 for injecting a molten resin into a cavity defined by the dies.

In this embodiment, the stationary platen 1 is fixed to a base plate 6, and the movable platen 3 is guided so as to contact or separate from the stationary platen 1, by four tie bars 7 fixed to the stationary platen 1.

By moving the movable platen 3, a parting surface 2a of the stationary die 2 and the parting surface 4a of the movable die 4 are brought into pressure contact with each other so as to be put into a die closed state in which the cavity is defined by molding sections of the dies (a molding section 2b of the stationary die 2 and a molding section 4b of the movable die 4) and a die open state in which the parting surfaces 2a and 4a are separated from each other.

Also, although the cavity is basically formed by the stationary die 2 and the movable die 4 in the injection molding section 100, an additional member such as an intermediate plate may be employed.

A film feeding unit 10 and a film winding unit 11 mounted on the movable platen 3 constitute a film moving section for moving the transfer film 20 with respect to a parting surface 4a of the movable die 4 (i.e., moving the transfer film 20 in the lengthwise direction of the film).

The transfer film 20 is moved in parallel to the parting surface 4a of the movable die 4, while being spaced therefrom.

The film feeding unit 10 and the film winding unit 11 are disposed so as to move in a direction perpendicular to the moving direction of the movable die 4 (i.e., in the widthwise direction of the transfer film 20), carried by a first movement mechanism 12 and a second movement mechanism 13, respectively. In other words, the film feeding unit 10 and the film winding unit 11 are activated in the widthwise direction of the film by the first movement mechanism 12 and the second movement mechanism 13, to thus constitute a film moving section which moves the transfer film 20 in the widthwise direction thereof.

In this embodiment, the film feeding unit 10 is mounted above the movable platen 3, and the transfer film 20 is moved in the widthwise direction by the first movement mechanism 12.

The film winding unit 11 is provided with a film tension mechanism 14 mounted below the movable platen 3 and a film winding mechanism 15 mounted on the baseplate 6, and the film tension mechanism 14 is moved in the widthwise direction of the transfer film 20 by the second movement mechanism 13.

The transfer film 20 is separated from the parting surface 4a of the movable die 4 and moved so as to become parallel to the surface.

Without limitation to the above arrangement, it is acceptable to mount the film feeding unit 10 below or on a lateral side portion of the movable platen 3 and mount the film winding unit 11 above or on the other lateral side of the movable platen 3 or to mount the film feeding unit 10 and the film winding unit 11 on the baseplate 6 or the stationary platen 1.

Accordingly, the film moving section can move the transfer film 20 in the lengthwise direction with respect to the die parting surface, before performing the transferring and molding process, and preferably in the widthwise direction with respect to the die parting surface (with respect to the parting surface 2a of the stationary die 2 or the parting surface 4a of the movable die 4) during the transferring and molding. The transfer film 20 can be moved in at least one of the lengthwise direction and the widthwise direction during the positional correction of the transfer film 20 described later.

Figure 3:
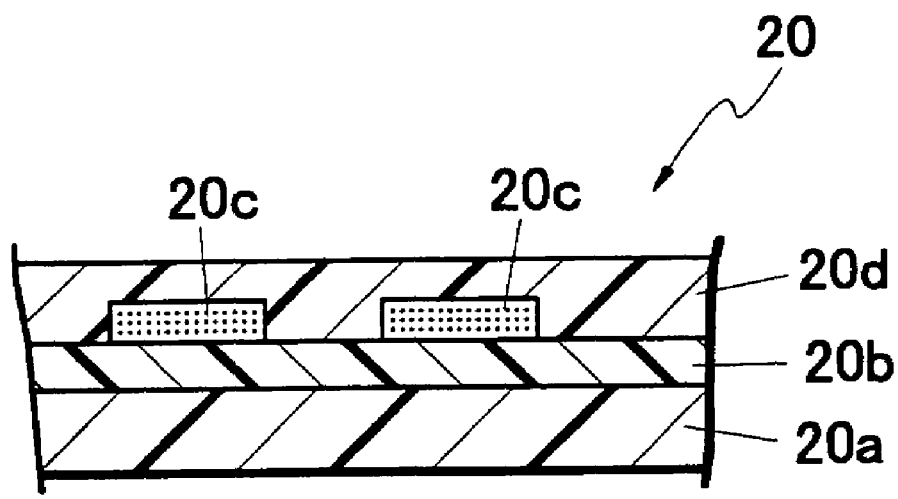
FIG. 3A is a sectional view showing a structure of a transfer film used in the transferring and molding apparatus of FIG. 1.
FIG. 3B is a schematic perspective view showing positional relations between the transfer film and sensors used in the transferring and molding apparatus of FIG. 1.
Figure 3B:
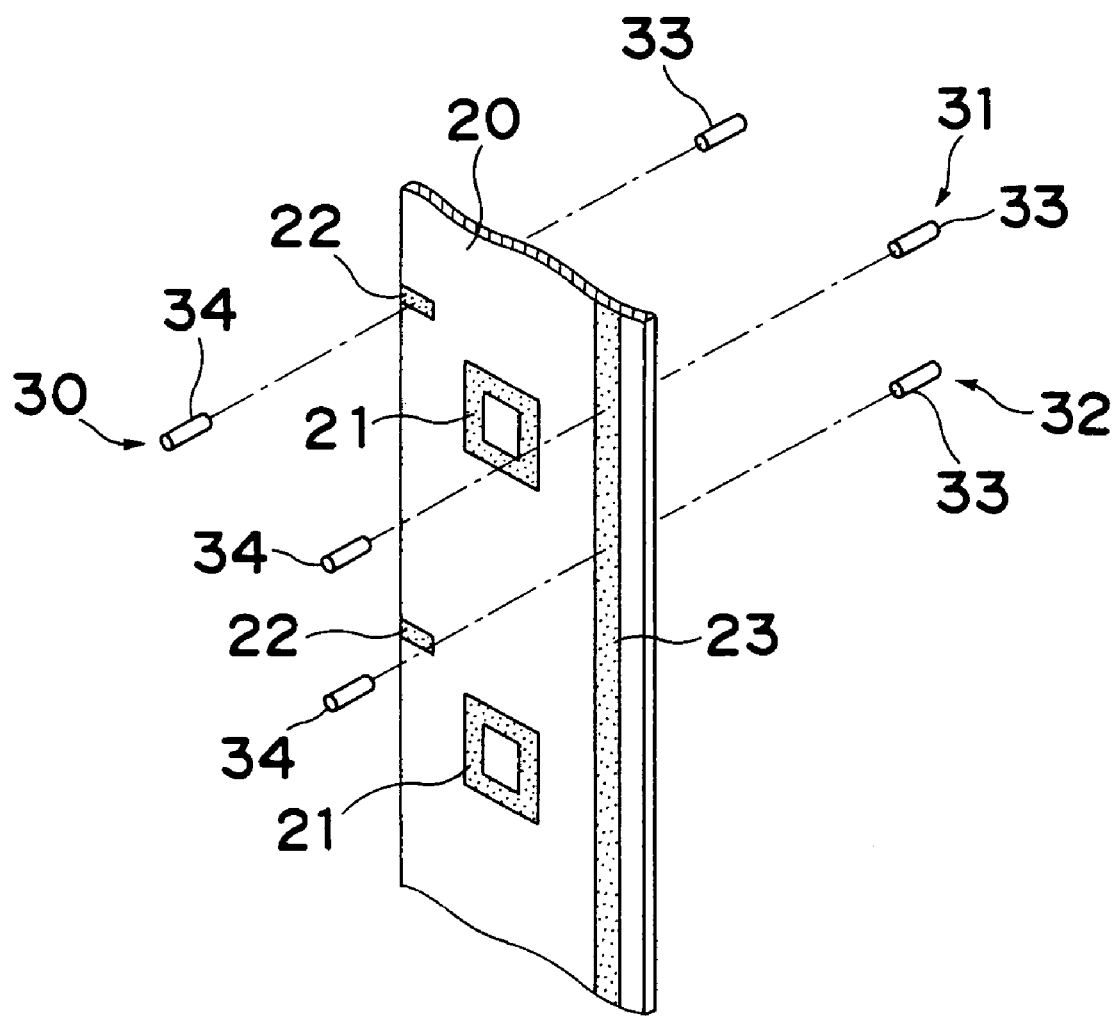

The transfer film will now be described. As shown in FIGS. 3A and 3B, the transfer film 20 has a plurality of patterns 21 longitudinally aligned at intervals along on a surface of a base film 20a. Since the pattern 21 is released from the base film 20a to be transferred to the molded article in the molding process performed in the injection molding section 100, the transfer film 20 includes a release protection layer 20b provided on the base film 20a, on which a pattern ink layer 20c constituting the pattern is provided. Also, on the pattern ink layer 20c an adhesive layer 20d is provided, so that the adhesive layer 20d adheres to the molten resin upon contacting the same when executing the injection molding, and thereby the pattern ink layer 20c is separated from the base film together with the release protection layer 20b, to thus be transferred onto the molded article.

The pattern 21 provided on the transfer film 20 is not limited to a print pattern, but a metal deposition layer may be employed so as to constitute the pattern ink layer 20c.

The pattern ink layer 20c may be any one of patterns, characters, symbols and so on used for the conventional transfer films, including a combination of a metal deposition layer and a print pattern.

As shown in FIG. 3B, the transfer film 20 is also provided with a lengthwise direction mark 22 and a widthwise direction mark 23, which serve for detection of the position of the transfer film 20 when the pattern 21 is transferred onto the molded article concurrently with the molding, i.e. the transfer position of the transfer film 20.

As shown in FIG. 3B, the lengthwise direction marks 22 (3 mm in width) provided at intervals on one side in the widthwise direction of the transfer film 20, and the widthwise direction mark 23 (3 mm in detecting width) are continuously provided on the other side in the lengthwise direction.

Although the transfer film 20 is transparent and the marks 22 and 23 are nontransparent in this embodiment, the marks 22 and 23 may be translucent. Moreover, it is acceptable that the transfer film 20 is nontransparent or translucent and the marks 22 and 23 are transparent.

This position detecting unit for the transfer film is provided with a lengthwise direction sensor 30 and first and second widthwise direction sensors 31, 32 attached to the die, as shown in FIGS. 1 and 2, to be used to detect the marks 22, 23 of the transfer film, and hence the position of the transfer film.

An example of each sensor will be described.

As shown in FIGS. 1 and 2, the lengthwise direction sensor 30 and the widthwise direction sensors, such as the first and the second widthwise direction sensors 31, 32, are located close to the die, for example the movable die 4. It is to be noted that it is not always necessary to provide two widthwise sensors, but just one, or three or more widthwise direction sensors may be provided.

The lengthwise direction sensor 30 is mounted on one side in the widthwise direction a little closer to the upper portion of the movable die 4. The first widthwise direction sensor 31 is mounted on the other side in the widthwise direction a little closer to the upper portion of the movable die 4, and the second widthwise direction sensor 32 is mounted on the other side in the widthwise direction a little closer to the lower portion of the movable die 4.

The lengthwise direction sensor 30 and the first and second widthwise direction sensors 31 and 32 detect the lengthwise direction marks 22 and the widthwise direction mark 23, respectively, of the transfer film 20 and detect the amounts of shift with respect to the respective marks.

For example, the sensors are each constituted of a laser line sensor (detecting width 3 mm), and provided with a light emitter 33 and a light detector 34. The light emitter 33 and the light detector 34 are located on both sides in the thickness direction of the transfer film 20 as shown in FIG. 3. Light from the light emitter 33 is received by the light detector 34 through the transfer film 20.

The lengthwise direction sensor 30 is oriented such that an extension thereof is aligned with the lengthwise direction of the transfer film, and the size (size in the lengthwise direction of the film) of light from the light emitter 33 of the lengthwise direction sensor 30 is generally equal to the size (size in the lengthwise direction of the film) of the lengthwise direction mark 22. Each of the first and the second widthwise direction sensors 31, 32 is oriented such that an extension thereof is aligned with the widthwise direction of the transfer film, and the size (width) of light from the light emitter 33 of each of the first and second widthwise direction sensors 31 and 32 is generally equal to the size (width) of the widthwise direction mark 23.

Figure 4A:
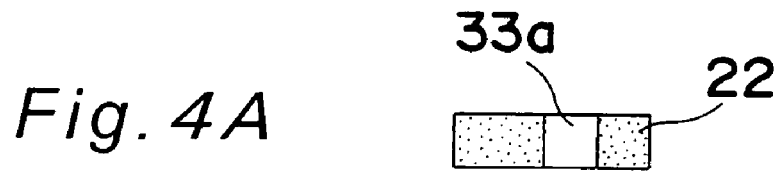
FIGS. 4A, 4B, and 4C are explanatory views of the detection of a lengthwise direction position performed by the transferring and molding apparatus of FIG. 1.

With this arrangement, in the case where the lengthwise direction mark 22 and the lengthwise direction sensor 30 coincide with each other when the transfer film 20 is located in the transfer position, the light 33a of the light emitter 33 is completely interrupted by the lengthwise direction mark 22 as shown in FIG. 4A, and the quantity of light received by the light detector 34 is zero.

Figure 4B:
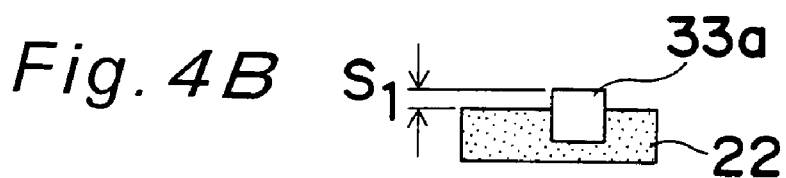

In the case where the lengthwise direction mark 22 goes beyond the lengthwise direction sensor 30 when the transfer film 20 is located in the transfer position, the light 33a of the light emitter 33 is shifted upward with respect to the lengthwise direction mark 22 as shown in FIG. 4B, and the light detector 34 receives the light of the quantity corresponding to the amount of shift $S_1$. Therefore, a shielding ratio of the mark with respect to the light detector 34 can be detected from the quantity of the received light.

Figure 4C:
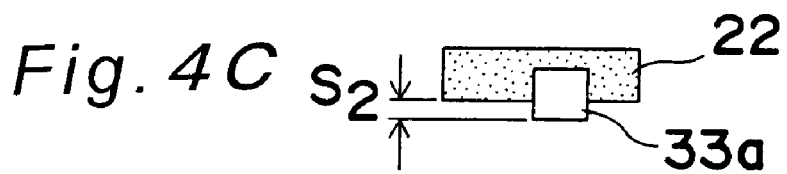

In the case where the lengthwise direction mark 22 falls short of the lengthwise direction sensor 30 when the transfer film 20 is located in the transfer position, the light 33a of the light emitter 33 is shifted downward with respect to the lengthwise direction mark 22 as shown in FIG. 4C, and the light detector 34 receives light corresponding in quantity to the amount of shift $S_2$. Therefore, a shielding ratio of the mark with respect to the light detector 34 can be detected from the quantity of the received light.

In the states shown in FIGS. 4B and 4C, the lengthwise position of the transfer film can be detected based on the shielding ratio of the mark 22 with respect to the light detector 34. Also, keeping the historic record of the shielding ratio of the light detector 34 while the transfer film moves in the lengthwise direction allows detecting the shift direction of the transfer film.

Specifically, in the transferring and molding apparatus shown in FIG. 1, since the transfer film is moved downward from an upper position, the magnitude of $S_2$ shown in FIG. 4C gradually becomes smaller, by which the shielding ratio of the light detector 34 gradually increases, until reaching the maximum in the state shown in FIG. 4A, and when the lengthwise direction mark 22 moves further downward to reach the state shown in FIG. 4B, the magnitude of $S_1$ gradually becomes larger with the movement of the mark, by which the shielding ratio of the light detector 34 gradually decreases.

Detecting thus the positional relation between the lengthwise direction sensor 30 constituted of a laser line sensor and the lengthwise position of the mark leads to detecting the shift dimension and shift direction of the transfer film in the lengthwise direction. Therefore, the lengthwise direction sensor 30 is the sensor section that detects the transfer position in the lengthwise direction of the transfer film 20 as a digital value.

Figures 5A, 5B, 5C:
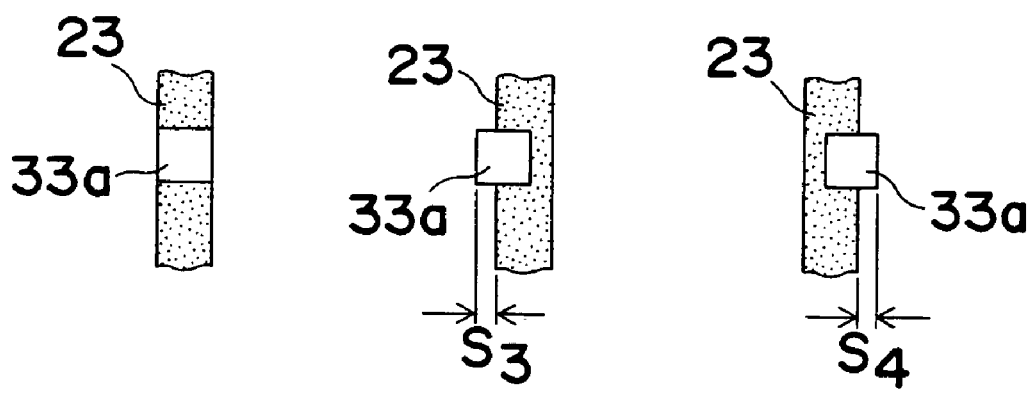
FIGS. 5A, 5B, and 5C are explanatory views of the detection of a widthwise direction position performed by the transferring and molding apparatus of FIG. 1.

In the case where the widthwise direction mark 23 coincides with the first widthwise direction sensor 31 when the transfer film 20 is located in the transfer position, the light 33a of the light emitter 33 is completely interrupted by the widthwise direction mark 23 as shown in FIG. 5A, and the quantity of light received by the light detector 34 is zero.

In the case where the widthwise direction mark 23 is shifted to one side in the widthwise direction with respect to the first widthwise direction sensor 31 when the transfer film 20 is located in the transfer position, the light 33a of the light emitter 33 is shifted to the other side in the widthwise direction of the widthwise direction mark 23 as shown in FIG. 5B, and the light detector 34 receives light of the quantity of received light corresponding to the amount of shift $S_3$. Therefore, a shielding ratio of the mark with respect to the light detector 34 can be detected from the quantity of the received light.

In the case where the widthwise direction mark 23 is shifted to the other side in the widthwise direction with respect to the first widthwise direction sensor 31 when the transfer film 20 is located in the transfer position, the light 33a of the light emitter 33 is shifted to the one side in the widthwise direction of the widthwise direction mark 23 as shown in FIG. 5C, and the light detector 34 receives light of the quantity of received light corresponding to the amount of shift $S_4$. Therefore, a shielding ratio of the mark with respect to the light detector 34 can be detected from the quantity of the received light.

In the states shown in FIGS. 5B and 5C, the widthwise position of the transfer film can be detected based on the shielding ratio of the mark 23 with respect to the light detector 34. Also, keeping the historic record of the shielding ratio of the light detector 34 while the transfer film moves in the widthwise direction allows detecting the shift direction of the transfer film.

The same applies to the positional relation between the second widthwise direction sensor 32 and the widthwise direction mark 23, and the position of the widthwise direction mark 23 can be measured by the second widthwise direction sensor 32.

Consequently, detecting the positional relation between the first and the second widthwise direction sensors 31, 32 constituted of laser line sensors and the widthwise position of the mark leads to detecting the shift dimension and shift direction of the transfer film in the widthwise direction. Therefore, the first and second widthwise direction sensors 31 and 32 are the sensors that detect the transfer position in the widthwise direction of the transfer film as digital values.

Hereunder, the transferring and molding method will be described.

The transferring and molding method of the present invention includes a transferring and molding process, a molded article inspection process and a transfer film position correction process.

The transfer process is repetitively carried out in the same way as in the conventional case, i.e. by successively feeding the transfer film, having the pattern 21 aligned at intervals, into a space between the stationary die 2 and the movable die 4.

For example, the method is comprised of: a first process for moving the transfer film 20 with the stationary die 2 and the movable die 4 put in the die open state and putting the pattern 21 in the transfer position where the pattern 21 faces the molding section of the die of, for example, the molding section 2b of the stationary die 2; a second process for holding the transfer film 20 between the dies by moving the movable die 4 after the first process and putting the dies into the die closed state and transferring the pattern 21 onto a molded article concurrently with molding by injecting a molten resin into its cavity "a"; and a third process for taking out the molded article on which the pattern 21 is transferred after the dies are put into the die open state.

The transfer film 20 is brought into the transfer position by presetting the position of the transfer film 20 in, for example, the widthwise direction, presetting the quantity of movement by the film moving section and intermittently moving the film by the quantity of movement in the lengthwise direction. The positioning is performed by detection of the position of the marks 22, 23 provided on the transfer film by the respective sensors 30, 31, 32, as will be described later.

The aforementioned molded article inspection process is carried out at any time in the process of detecting the shift dimension and the shift direction of the pattern of the molded article that has undergone the transferring and molding in the aforementioned transferring and molding process. The transferring and molding process is carried out after the transfer film position correction process is carried out when there is a shift, and the aforementioned transferring and molding process is carried out when there is no shift.

The shift dimension herein stands for the amount of deviation of the pattern from the predetermined position, and the shift direction stands for the direction in which the pattern is shifted, viewed from the predetermined position.

Figure 6A:
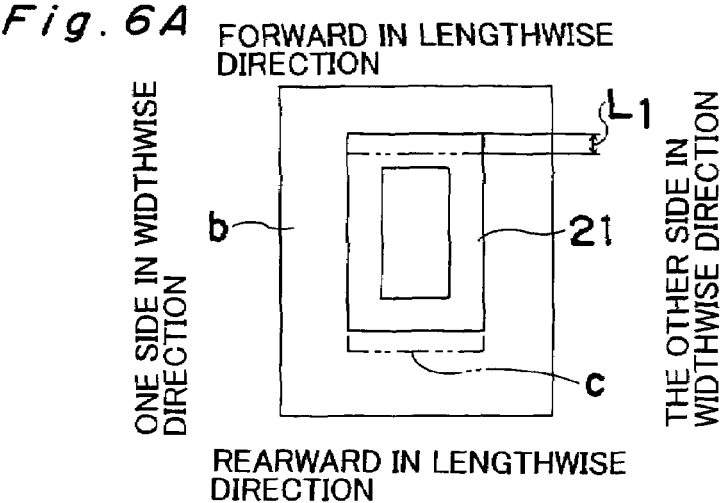
FIGS. 6A, 6B, and 6C are explanatory views of pattern shifts on molded articles produced by the transferring and molding apparatus of FIG. 1.

For example, if the pattern 21 transferred onto the molded article "b" is shifted in the lengthwise direction with respect to a prescribed position "c" indicated by the imaginary line as shown in FIG. 6A, then a shift dimension $L_1$ in the lengthwise direction is measured, and the forward shift in the lengthwise direction (shift direction) is detected. This lengthwise direction is the lengthwise direction of the transfer film 20.

Figure 6B:
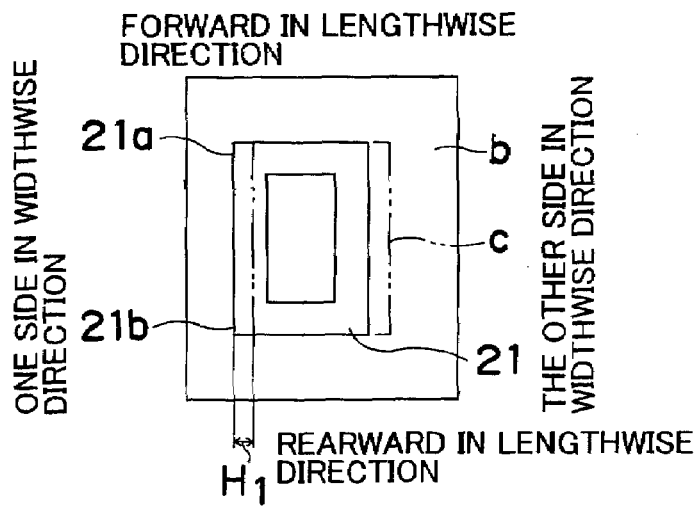

If the pattern 21 transferred onto the molded article "b" is shifted in the widthwise direction with respect to the prescribed position "c" indicated by the imaginary line as shown in FIG. 6B, then a shift dimension $H_1$ in the widthwise direction is measured, and the shift toward one side in the widthwise direction (shift direction) is detected. This widthwise direction is the widthwise direction of the transfer film 20.

It is preferable to measure the shift dimension $H_1$ in the widthwise direction in each of the lengthwise forward portion 21a and the lengthwise rearward portion 21b of the transferred pattern 21 in FIG. 6B.

Figure 6C:
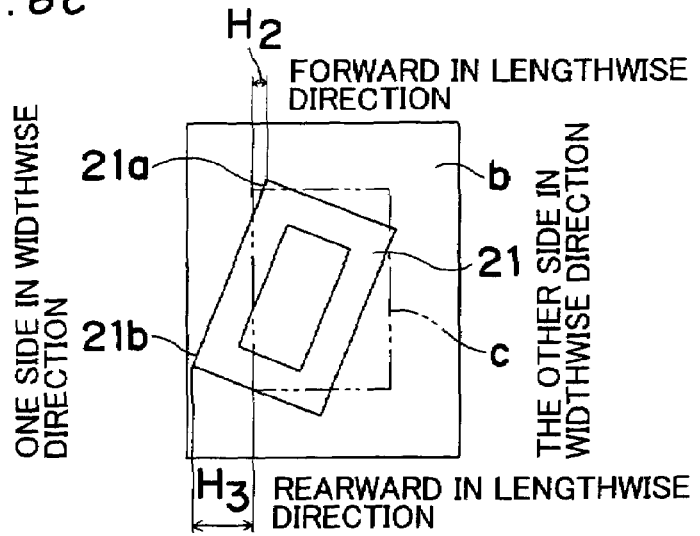

With this arrangement, it can be perceived that the pattern 21 has been transferred aslant by a difference $|H_2-H_3|$ between a shift dimension $H_2$ in the widthwise direction of the lengthwise forward portion 21*a* and a shift dimension $H_3$ in the widthwise direction of the lengthwise rearward portion 21*b* as shown in FIG. 6C.

Also, while the widthwise shift dimension $H_1$ is measured at a plurality of points so as to detect the diagonal shift in the above example, measuring the lengthwise shift dimension at a plurality of points also allows detecting the shift dimension $H_1$. In addition, when measuring the shift dimension at a plurality of points, the number of points is not limited to two, but the measurement may be performed at three or more points.

The above measurement of the shift dimensions $L_1$ and $H_1$ and the detection of the shift direction are carried out in a pattern detection section for image processing or the like using an image recognition device of ITV or the like. The pattern detection section shoots the molded article when or after taking out the molded article, and calculates the shift dimension of the pattern on the molded article in the form of a digital value. The ITV herein referred to stands for an image recognition device that shoots the molded article with a TV camera and analyzes the shot image so as to detect the position of the pattern. To be more detailed, the device shoots the molded article at an angle that covers the pattern, and recognizes the color or shape of the shot image and measures the distance from the outer frame of the molded article to the pattern in the image data, to thus measure the position of the pattern on the molded article. The information on the measured position of the pattern is compared with the predetermined position, based on which the shift dimension and shift direction are output in digital values.

This molded article inspection process may be carried out for one molded article selected from a plurality of molded articles, after the aforementioned transferring and molding process has been repetitively executed a plurality of times, i.e., after the plurality of molded articles have been produced.

For example, the above process is carried out for the next one molded article after ten molded articles have been discharged.

Moreover, the above process may be carried out for each transferring and molding process, i.e., for each detected molded article. That is, the molded article inspection process is carried out at any time.

The transfer film position correction process is a process for carrying out positional correction by moving the transfer film 20 on the basis of the shift dimension in the transfer position of the transfer film and the aforementioned shift dimensions $L_1$ and $H_1$ of the pattern 21 of the molded article.

For example, to determine a reference position of the transfer position for the transfer film during an initial stage upon activating the apparatus, the shielding ratio for the respective sensors 30, 31, 32 may be set at 50%, and upon calculating the transfer position for the transfer film that allows correcting the shift dimension $L_1, H_1$ of the pattern 21 on the molded article, the transfer film is moved such that the respective sensors 30, 31, 32 gains the predetermined shielding ratio at the calculated position.

For example, when the pattern 21 transferred onto the molded article b is shifted forward in the lengthwise direction as shown in FIG. 6A, the position of the transfer film 20 that allows correcting the shift dimension L1 is detected, and the transfer film 20 is moved backward in the lengthwise direction such that the shielding ratio of the transfer film position detecting unit becomes that value, at which point the movement of the transfer film is stopped.

It is preferable to detect the lengthwise direction position of the transfer film 20 after the positional correction by the lengthwise direction mark 22 and the lengthwise direction sensor 30 after the movement of the transfer film 20 and detect the quantity of movement in the lengthwise direction of the transfer film 20 by a difference between the detected lengthwise direction position and the aforementioned transfer position in the lengthwise direction before the positional correction detected as shown in FIGS. 4A to 4C.

This quantity of movement is compared with the shift dimension $L_1$, and if they do not coincide with each other, then they are made to coincide with each other by moving again the transfer film 20 in the lengthwise direction by the difference.

By the above operation, the positional correction can be achieved by accurately moving the transfer film 20 in the lengthwise direction by the shift dimension $L_1$.

That is, since the transfer position and the position after the positional correction of the transfer film 20 can be detected as digital values, the positional difference can be detected as a digital value.

Therefore, the transfer film 20 can be moved so that the shift dimension and the positional difference coincide with each other, and thereby the pattern shift on the molded article can be corrected.

Moreover, if the pattern 21 transferred onto the molded article "b" is shifted to one side in the widthwise direction as shown in FIG. 6B, then positional correction is carried out by moving the transfer film 20 to the other side in the widthwise direction by the aforementioned measured shift dimension $H_1$.

It is preferable to detect the widthwise direction position of the transfer film 20 after the positional correction by the widthwise direction mark 23 and the first and second widthwise direction sensors 31 and 32 after the movement of the transfer film 20, and detect the quantity of movement in the widthwise direction of the transfer film 20 by a difference between the detected widthwise direction position and the aforementioned transfer position in the widthwise direction before the positional correction detected as shown in FIGS. 5A-5C.

This quantity of movement is compared with the aforementioned shift dimension $H_1$, and if they do not coincide with each other, then they are made to coincide with each other by moving again the transfer film 20 in the widthwise direction by the difference.

By the above operation, the positional correction can be achieved by accurately moving the transfer film 20 in the widthwise direction by the shift dimension $H_1$.

If the pattern 21 transferred onto the molded article b in inclined as shown in FIG. 6C, the positional correction is carried out by moving the forward side and the rearward side in the lengthwise direction of the transfer film 20, similarly to the aforementioned case. In other words, the shielding ratio to be gained by the first and the second widthwise sensors 31, 32 after the correction is calculated, and the transfer film is moved such that both sensors respectively gain the calculated ratio.

In order to thus carry out the positional correction of the transfer film 20, it is required that a pair of widthwise direction sensors are provided with a spacing in the lengthwise direction as described above, and that the film moving section is able to move the transfer film 20 in the widthwise direction on the forward side and the rearward side of the die as described above. The specific structure relating to this aspect will be described later.

The aforementioned positional correction operation of the transfer film 20 is automatically carried out by interlocking the transfer film position correction process with the molded article inspection process. Consequently, the positional correction of the transfer film is automatically performed so as to determine the position of the transfer film that allows correcting the pattern shift on the molded article detected in the molded article inspection process, which eliminates the need to suspend the transferring and molding process and enables maintaining the position of the pattern 21 at the appropriate position, on a plurality of molded articles to be successively produced.

For example, the shift dimension of the pattern 21 of the molded article is detected as a first digital value in the molded article inspection process, and the position where the transfer film 20 is supposed to be upon completing the correction is detected based on a second digital value, and when both of the digital values coincide with each other, then the transfer film 20 is automatically stopped.

Specifically, the detected transfer position and shift dimension of the transfer film 20 are inputted to a controller, and the controller outputs a control signal to the film moving section to move the transfer film 20. The position of the transfer film 20 is sequentially detected with this movement, and the quantity of movement is calculated by feeding the position back to the controller. When the shielding ratio accords with the shielding ratio of the respective sensors that allows correcting the position shift calculated from the shift dimension, the film moving unit is stopped, to thus finish the correction of the transfer film.

If the transfer film 20 is moved by the shift dimension in the direction opposite from the shift direction and the transferring and molding process is subsequently carried out as described above, then the pattern 21 can be correctly transferred in the prescribed position of the molded article.

Even if the position of the transfer film 20 is corrected as described above, it is sometimes the case where the pattern 21 cannot be correctly transferred in the prescribed position of the molded article.

To cope with the above-mentioned case, the position of the pattern 21 of the molded article that has undergone the transferring and molding is detected again after carrying out the positional correction of the transfer film 20, and the positional correction of the transfer film 20 is carried out again when there is a shift. By repeating this operation, the pattern 21 of the molded article is correctly transferred in the prescribed position.

That is, it is preferable to carry out again the molded article inspection process after carrying out the transfer film position correction process and repetitively carry out again the positional correction process of the transfer film 20 if there is a shift of the pattern 21 of the molded article.

In carrying out again the positional correction of the transfer film 20 as described above, it is preferable to do as follows.

There is detected a difference between the shift dimension of the pattern 21 of the molded article that has undergone the transferring and molding before the positional correction of the transfer film 20 and the shift dimension of the pattern 21 of the molded article that has undergone the transferring and molding after the positional correction of the transfer film 20.

Then, in carrying out again the positional correction of the transfer film 20, the transfer film is moved by the aforementioned detected difference.

In the above description, a tolerance range is set for the shift dimension of the pattern 21 transferred onto the molded article. The positional correction of the transfer film 20 is not carried out when the shift dimension falls within the tolerance range, and the positional correction of the transfer film 20 is carried out when the shift dimension falls outside the tolerance range. The tolerance range is arbitrarily set depending on the molded article. For example, the tolerance range is set within a value range of ±0.1 mm to ±0.05 mm.

It is sometimes the case where the range of tolerance in the lengthwise direction position of the pattern transferred onto the molded article is large or a similar case depending on the product. In this case, there is no need to carry out the positional correction in the lengthwise direction of the transfer film 20, and therefore, neither the lengthwise direction sensor 30 nor the lengthwise direction mark 22 is necessary.

Moreover, it is sometimes the case where the range of tolerance in the widthwise direction position of the pattern transferred onto the molded article is large or a similar case depending on the product. In this case, there is no need to carry out the positional correction in the widthwise direction of the transfer film 20, and therefore, neither the first and second widthwise direction sensors 31 and 32 nor the widthwise direction mark 23 is necessary.

In this embodiment, the film moving section is provided with the film feeding unit 10 and the film winding unit 11 and includes the first and second widthwise direction sensors 31 and 32. Further, the first widthwise direction sensor 31 is located a little closer to the film feeding unit 10 of the die (movable die 4) and the second widthwise direction sensor 32 is located a little closer to the film winding unit 11 of the die (movable die 4). Therefore, the film feeding unit 10 is moved in the widthwise direction by controlling the first movement mechanism 12, and the film winding unit 11 is moved in the widthwise direction by controlling the second movement mechanism 13. Further, the aforementioned operation is carried out in the widthwise direction position detected by the first widthwise direction sensor 31 and in the widthwise direction position detected by the second widthwise direction sensor 32.

By the above operation, the positional correction can be rapidly achieved accurately in the widthwise direction by moving both the side portions in the direction of movement of the transfer film 20 in the widthwise direction with respect to the die (movable die 4) serving as a boundary.

A specific configuration of the film feeding unit 10 will be described.

A bracket 40 is mounted on the movable platen 3, and the bracket 40 is provided with a movable member 41 movably in the direction of movement of the movable platen 3. Further, a third movement mechanism 42 that moves the movable member 41 in the aforementioned direction is further provided extended over the movable member 41 and the bracket 40.

For example, a threaded rod 42a meshed with the movable member 41 is rotatably joined to the bracket 40, and the movable member 41 is set to move in a moving direction of the movable platen 3 by tightening or loosening the threaded rod 42a. Also, the movable member 41 is screwed to the threaded rod 42a with the locknut 42b.

The third movement mechanism 42 may be provided by one that rotates the threaded rod 42a by means of a cylinder or a motor and meshing a nut with the threaded rod.

The movable member 41 is provided with a housing 43 movably in the widthwise direction of the transfer film 20, and the first movement mechanism 12 is provided so as to move the housing 43 in the widthwise direction with respect to the movable member 41.

A feed reel 44 and a feed roller 45 are rotatably supported by the housing 43. The transfer film 20 is wound around this feed reel 44, and the feed reel 44 is driven in forward and reverse directions by a first motor 46. This feed reel 44 is provided by mounting a pair of flanges 44b on a shaft 44a and is removably mounted on the housing 43.

The first movement mechanism 12 is provided by mounting a motor 12b on a guide frame 12a and meshing a nut 12d with a threaded rod 12c rotated by this motor 12b so that the nut 12d is made movable along the guide frame 12a. The guide frame 12a is fixed to the movable member 41, and the nut 12d is fastened to the housing 43.

The movable member 41 is provided with a guide frame 47, and a slider 48 that moves along this guide frame 47 is fastened to the housing 43 so that the housing 43 smoothly moves with respect to the movable member 41.

With this arrangement, by forwardly or freely rotating the feed reel 44, the transfer film 20 is unwound and fed from the feed roller 45.

Moreover, the feed roller 45 is moved in the direction of movement of the movable platen 3 together with the housing 43 by moving the movable member 41 by the third movement mechanism 42. Therefore, space between the parting surface 4a of the movable die 4 and the transfer film 20 can be adjusted by adjusting the feed position of the transfer film 20.

Moreover, the transfer film 20 wound around the feed reel 44 is moved in the widthwise direction by moving the housing 43 with respect to the movable member 41 by the first movement mechanism 12. Therefore, the transfer film 20 can be moved in the widthwise direction.

The transfer film delivered by the film feeding unit 10 passes through between the dies 2, 4, and forwarded by the film tension mechanism 14.

A specific configuration of the film tension mechanism 14 will be described.

The film tension mechanism 14 is provided with a driving roller 50 and a driven roller 51, and the driving roller 50 is rotatively driven by a second motor 52. The driven roller 51 can be freely brought into pressure contact with and separated from the driving roller 50. The transfer film 20 is inserted between the driving roller 50 and the driven roller 51 in the separated state, and a tension is given to the transfer film 20 by conveying the film 20 by the driving of the driving roller 50 put in the pressure contact state. At this stage, the feed reel 44 of the film feeding unit 10 is controlled by the first motor 46.

In this embodiment, the driving roller 50 and the second motor 52 are mounted on the first housing 53, while the driven roller 51 is mounted on the second housing 54.

The first housing 53 and the second housing 54 are pivotably joined to each other, and an urging device of, for example, a spring 55 is mounted across the first housing 53 and the second housing 54.

By removing the spring 55 and making the second housing 54 pivot in a direction in which it is separated from the first housing 53 (e.g., downward), the driving roller 50 and the driven roller 51 are separated from each other.

By mounting the spring 55 thereacross, the second housing 54 is pivotally urged in a direction in which the second housing 54 comes closer to the first housing 53, so that the driving roller 50 and the driven roller 51 are brought into pressure contact with each other.

The film tension mechanism 14 (e.g., the first housing 53) is mounted on the movable platen 3 via the second movement mechanism 13.

In this embodiment, a bracket 56 is mounted on the movable platen 3, and this bracket 56 is provided with a movable member 57 movably in the direction of movement of the movable platen 3. For fixing the movable member 57 and the bracket 56, a fourth movement mechanism 58 is provided, which attaches the movable member 57 to the bracket so as to move in the moving direction of the movable platen 3.

For example, a threaded rod 58a meshed with the movable member 57 is rotatably joined to the bracket 56, and the movable member 57 is moved by tightening and loosening the threaded rod 58a. Here, the movable member 57 is screwed to the threaded rod 58a with the locknut 58b.

The fourth movement mechanism 58 may be provided by one that rotates the threaded rod 58a by means of a cylinder or a motor and meshing a nut with the threaded rod.

To the movable member 57, the film tension mechanism 14 is movably attached in the widthwise direction of the transfer film 20, and the second movement mechanism 13 is provided for moving the film tension mechanism 14 in the widthwise direction with respect to the movable member 57.

As shown in FIG. 2, similarly to the first movement mechanism 12, in this second movement mechanism 13, a motor 13b is mounted on a guide frame 13a, a nut 13d is meshed with a threaded rod 13c rotated by this motor 13b, and the nut 13d is made movable along the guide frame 13a. The guide frame 13a is fixed to the movable member 57, and the nut 13d is fixed to the film tension mechanism 14 (first housing 53).

This second movement mechanism 13 and the first movement mechanism 12 are not limited to the aforementioned ones and are allowed to be provided by a combination of a cylinder or a motor, a threaded rod, and a nut, and so on.

With this arrangement, the transfer film 20 can be moved in the thickness direction by moving the film tension mechanism 14 in the direction of movement of the movable platen 3, and the transfer film 20 can be moved in the widthwise direction by moving the film tension mechanism 14 in the widthwise direction of the transfer film 20.

The transfer film 20 is urged by the film tension mechanism 14 toward the film winding mechanism 15, to be wound thereon.

A specific configuration of the film winding mechanism 15 will be described.

As shown in FIGS. 1 and 7 through 9, the film winding mechanism 15 can freely move into a film dismounting position in which the mechanism 15 protrudes outwardly of an end portion 8a (forward end 8a in the moving direction of the movable platen 3) of the apparatus main body 8 and a film winding position inside the apparatus main body 8.

With this arrangement, the film winding mechanism 15 can be positioned inside the apparatus main body 8 during the molding operation, so that the mechanism 15 does not obstruct a person walking along the periphery of the apparatus main body 8, or in a similar case.

Moreover, when dismounting the used transfer film 20, which is wound after the transfer operation, the dismounting work can be carried out by moving the film winding mechanism 15 outwardly of the apparatus main body 8, facilitating the film dismounting work.

In this embodiment, the film winding mechanism 15 includes upper and lower guide rails 60 attached in parallel to the apparatus main body 8 (base plate 6) so as to extend in the film movement direction, and end portions of these guide rails 60 protrude outwardly of the end portion 8a of the apparatus main body 8. The guide rails 60 are connected to the apparatus main body 8 (base plate 6) with a connector 66.

Figure 8:
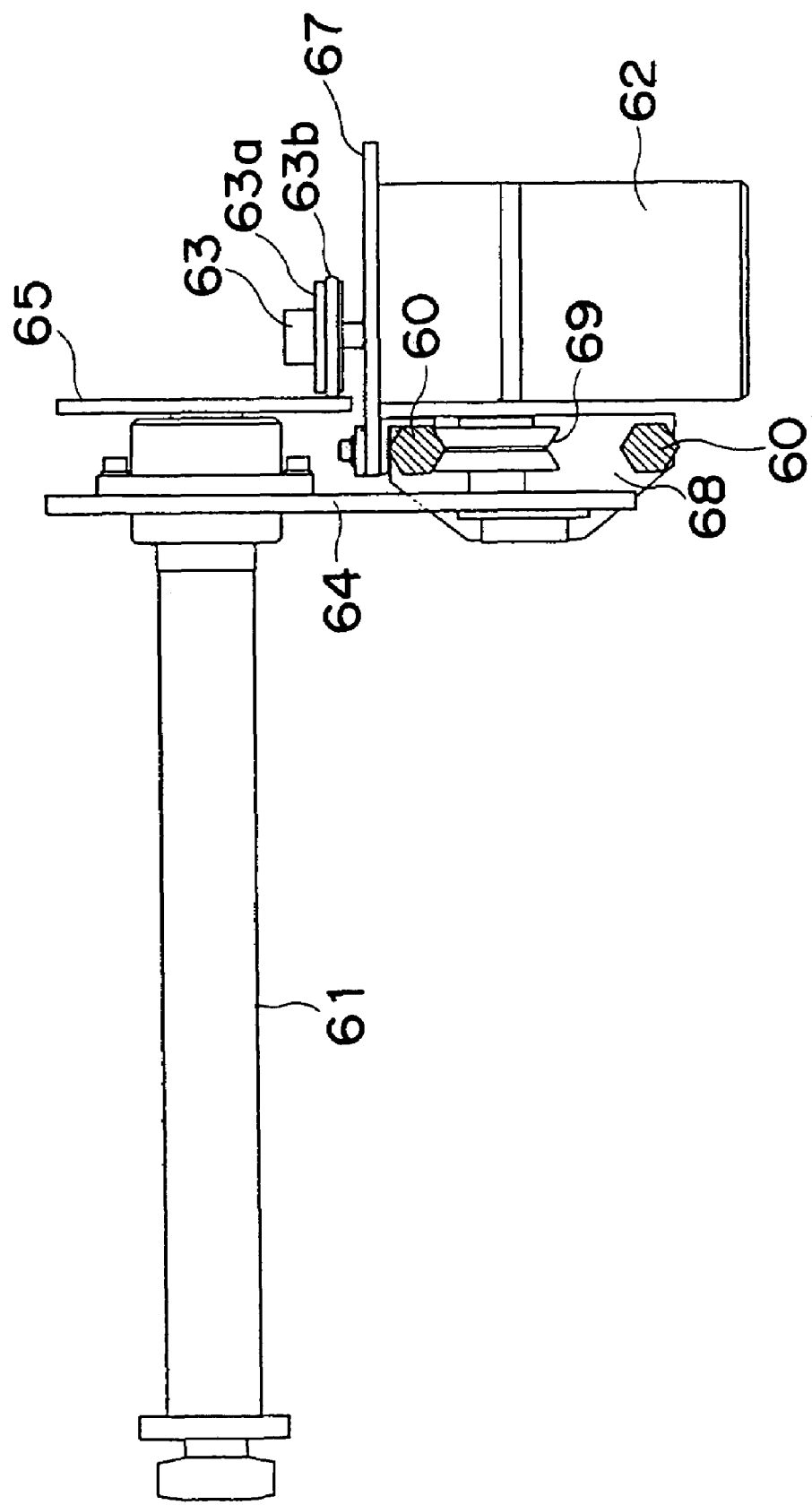
FIG. 8 is a detailed sectional view taken along the line C-C of FIG. 7.

The guide rails 60 have a hexagonal sectional shape as shown in FIG. 8, and are connected via a plate 68. The guide rails 60 are adjustable in length and able to take a protruded posture in which the rails are protruded from the end portion 8a of the apparatus main body 8.

Figure 7:
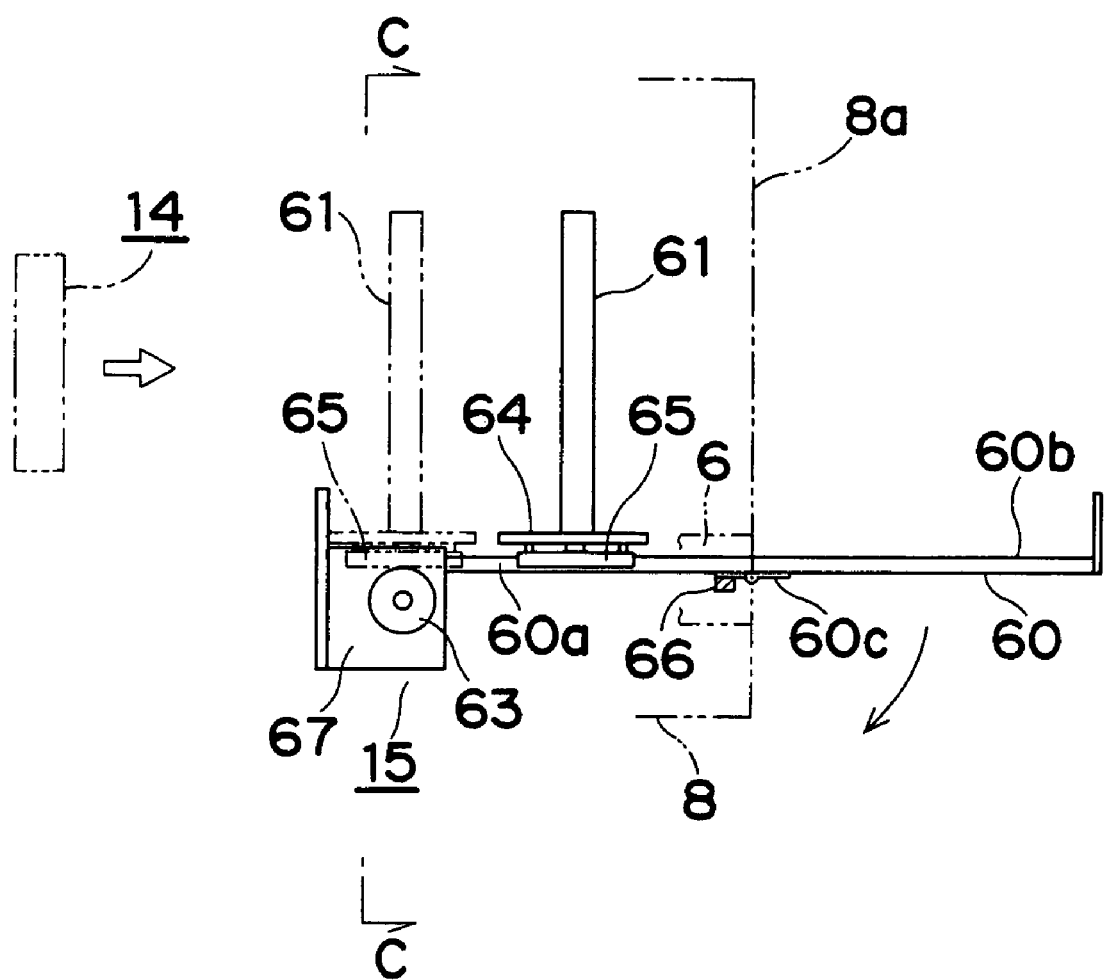
FIG. 7 is a sectional view taken along the line B-B of FIG. 1.
Figure 9:
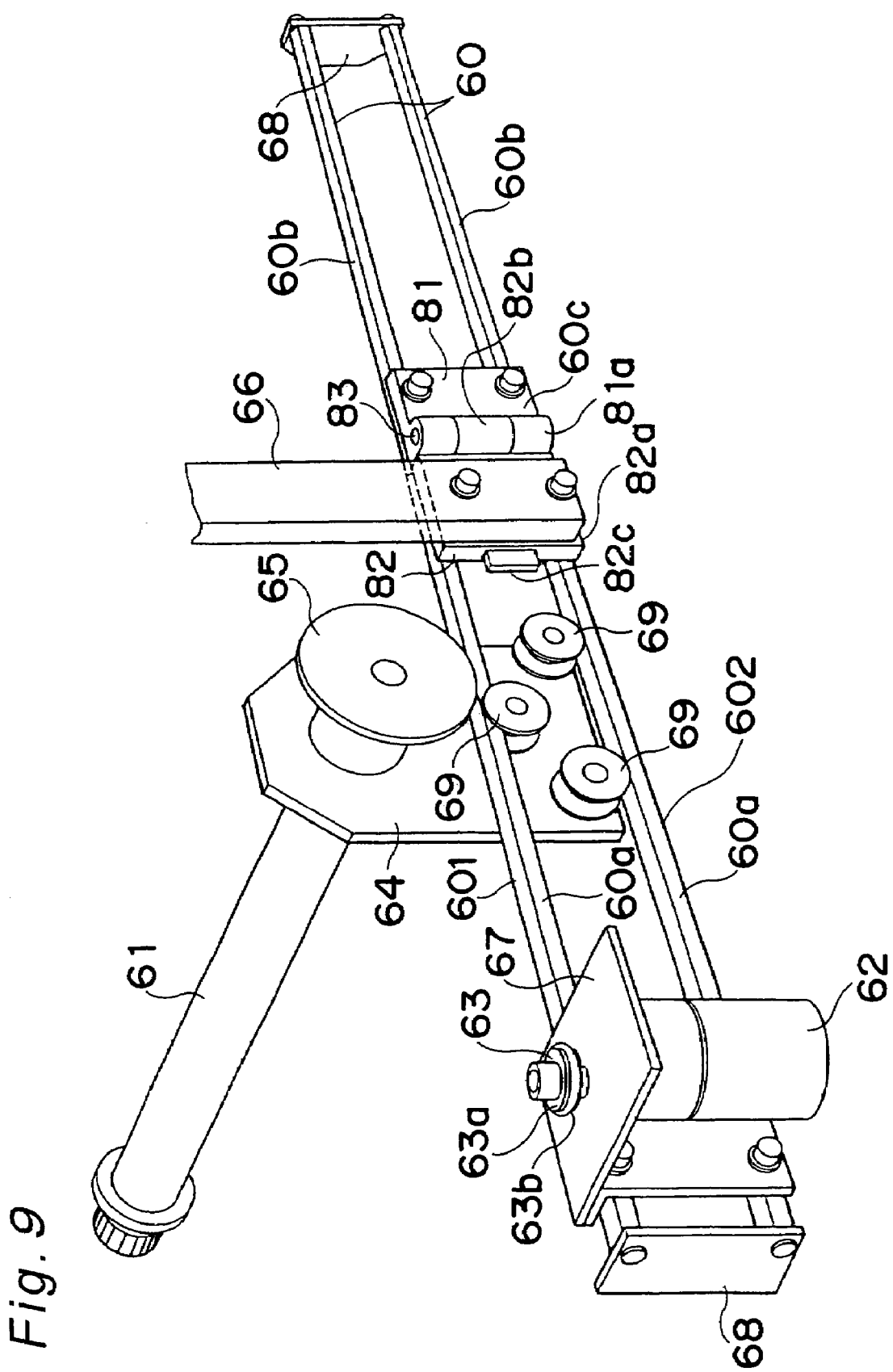
FIG. 9 is a perspective view of a film winding mechanism included in the transferring and molding apparatus of FIG. 1.

In this embodiment, as shown in FIGS. 7 and 9, the guide rails include base portion guide rails 60a and tip portion guide rails 60b connected to the apparatus main body 8 (base plate 6) with a connector 66, and the base portion guide rails 60a and tip portion guide rails 60b are bendably connected via a hinge 60c. The hinge 60c includes a first piece 81 and a second piece 82 pivotally joined to each other via a pin 83, and the tip portion of the guide rail 60b is attached to the first piece 81, while the base portion of the guide rail 60a is attached to the second piece 82.

Specifically, as shown in FIG. 9, the one side piece 81 has a pair of pin bearing portions 81a, and the other side piece 82 has a configuration that includes a movable plate 82c having a pin bearing portion 82b at its fitting portion 82a. The pin bearing portions 81a and 82b are joined together via the pin 83.

When the base portion guide rails 60a and the tip portion guide rails 60b are rectilinearly extended, the tip portion guide rails 60b project beyond the edge 8a of the apparatus main body 8, thus to present the protruded posture. When the tip portion guide rails 60b are folded, the tip portion guide rail 60b are accommodated in the apparatus main body 8, to thus enter the retracted posture. Here, to enter the retracted posture, the tip portion guide rails 60b may be folded to a direction opposite (i.e. upward in FIG. 7) to the arrow in FIG. 7. Such configuration allows reducing the portion protruding from the apparatus main body 8, by folding the tip portion guide rails 60b to the same direction as the winding reel 61, to be subsequently described.

Providing the hinge thus constructed between the tip portion guide rails 60b and the base portion guide rails 60a allows presenting the retracted posture by folding the tip portion guide rails 60b at the hinge 60c.

Also, in the example shown in FIG. 9, the hinge 60c is fixed to the guide rail such that the pin bearing portions 81a, 82b are located on the side where a movable member 64 is not provided, so as to allow the guide rail to be folded in the direction indicated by the arrow in FIG. 7, and to thereby avoid the interference between the tip portion guide rail 60b and the movable member 64.

Further, the guide rail 60 may have a telescopic structure, to present both the retracted posture in which the guide rail is accommodated inside the apparatus main body 8 and the protruded posture in which the guide rail is projecting beyond the edge 8a of the apparatus main body 8.

Also, the base portion guide rail 60a is provided with a bracket 67 attached to the end portion opposite to the hinge 60c, and a third motor 62 is mounted on the bracket 67. The third motor 62 includes a rotating member 63 rotationally driven by the third motor 62.

The guide rail 60 is provided with the movable member 64 that can move between the film releasing position and film winding position. The movable member 64 is provided with a wheel 69 contacting the lower face of the upper rail 601 and wheels 69 contacting the upper face of the lower rail 602, so as to be held between the guide rails 60 and thus to smoothly move along the guide rails 60.

The wheels 69 attached to the movable member 64 have a dovetail groove, which fits the guide rail having a hexagonal sectional shape, and prevents the wheel 69 from falling off from the guide rail and shifting in the widthwise direction of the guide rail.

The winding reel 61 is rotatably supported by the movable member 64 that moves along the guide rails 60, and a rotary disk 65 is attached to a tip portion of the winding reel 61, perpendicularly to the rotation axis of the winding reel 61.

When the movable member 64 is at the film winding position indicated by the imaginary line in FIG. 7, the winding reel 61 is driven to rotate by the third motor 62, at the film winding position as shown in FIG. 8.

More specifically, when the movable member is located at the film winding position, the rotary disk 65 and the rotating member 63 of the third motor are brought into contact, or preferably into pressure contact with each other. When the third motor 62 is activated to drive the rotary disk 65 to rotate, the rotational force is transmitted to the rotary disk 65 because of the friction acting therebetween, thus causing the winding reel 61 to rotate. In this embodiment, the rotating member 63 is provided with a rubber ring 63b attached to the outer circumferential surface of the rotary disk 63a, to thus increase the frictional resistance.

A specific configuration of each sensor will be described.

The lengthwise direction sensor 30 and the first and second widthwise direction sensors 31 and 32 are movable in the direction of movement of the movable platen 3 (thickness direction of the transfer film 20), the direction of movement of the transfer film 20 (lengthwise direction) and the widthwise direction of the transfer film 20, and are able to adjust the position in the lengthwise direction according to the size of the pattern 21 of the transfer film 20 and the size of the dies, able to adjust the position in the direction of movement of the movable platen 3 according to the size of the dies (size in the direction of movement of the movable platen 3), and able to adjust the position in the widthwise direction according to the width of the transfer film 20.

For example, as shown in FIGS. 1 and 2, a first movable member 71 is mounted movably in the direction of movement of the movable platen 3 along lateral guides 70 mounted on each of the brackets 40 and 56, and vertical rods 72 are supported to each first movable member 71 slidably in the direction of movement of the transfer film 20 (vertical direction). A second movable member 73 is mounted on each vertical rod 72, and each second movable member 73 is made movable in the vertical direction.

A bracket 74 is mounted on this second movable member 73 movably in the widthwise direction of the transfer film 20.

By mounting the light emitters 33 and the light detectors 34 on the brackets 74, the lengthwise direction sensor 30 and the first and second widthwise direction sensors 31 and 32 are provided.

Figure 10:
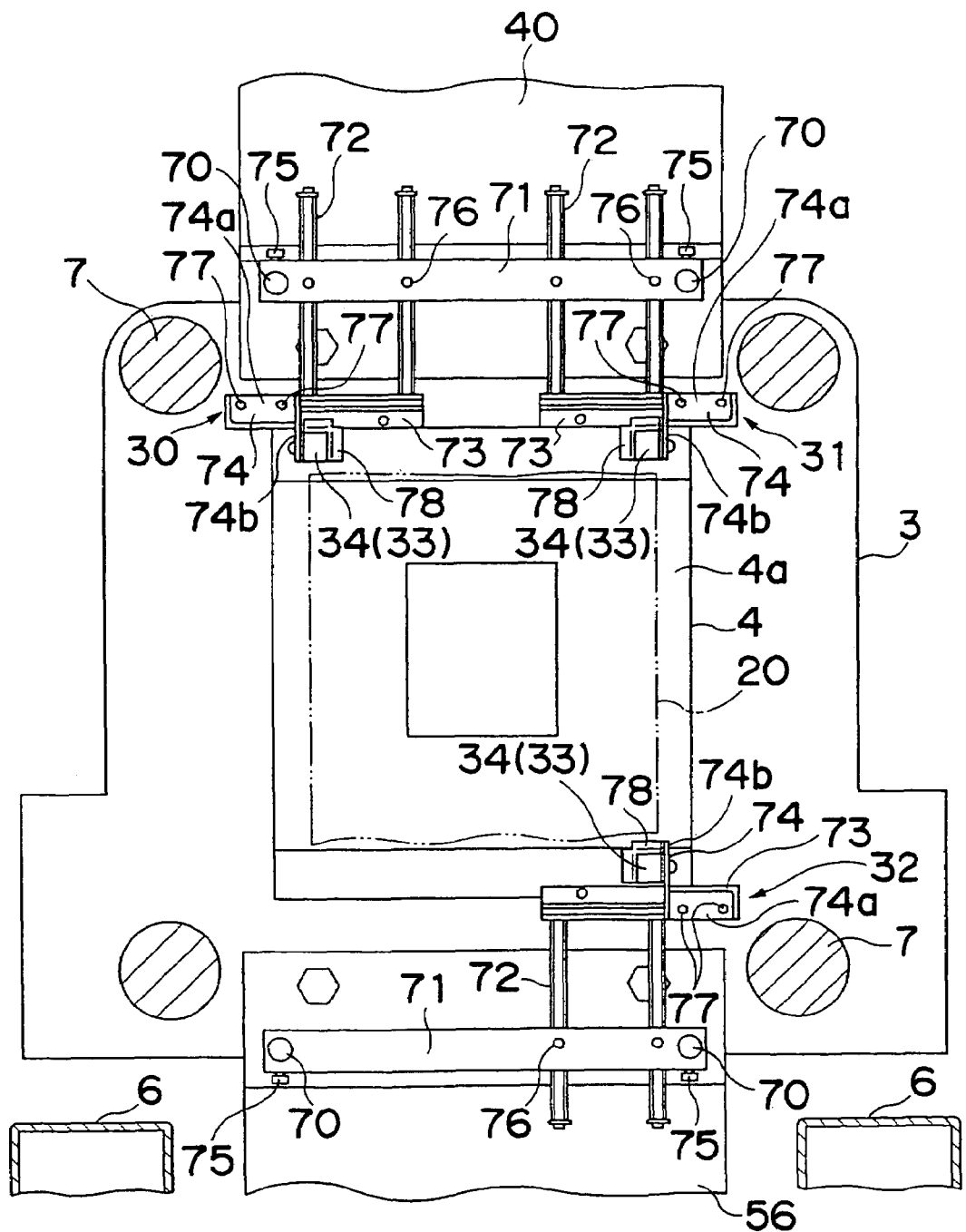
FIG. 10 is an enlarged view of a sensor mounting section included in the transferring and molding apparatus of FIG. 1.

Specifically, as shown in FIG. 10, the first movable member 71 is fixed by tightening first screws 75, and the first movable member 71 is moved along the lateral guides 70 by loosening the screws 75.

The vertical rods 72 are fixed by tightening second screws 76, and the vertical rods 72 are vertically moved with respect to the first movable member 71 by loosening the screws 76.

Figure 11:
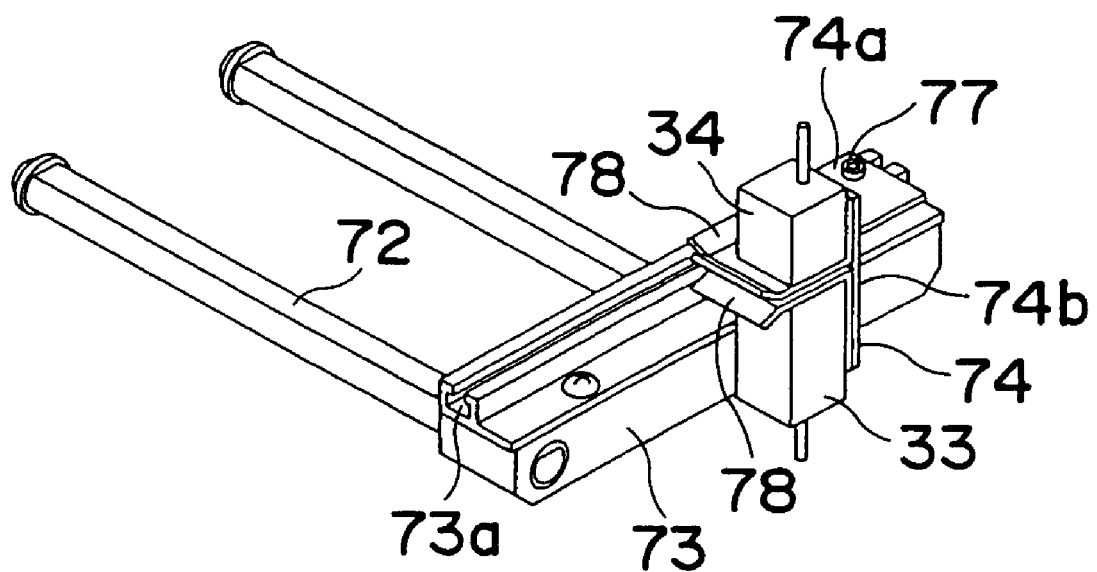
FIG. 11 is a perspective view of the mounting section of a first widthwise direction sensor included in the transferring and molding apparatus of FIG. 1.

As shown in FIG. 11, the bracket 74 is provided with a mounting piece 74a and a sensor mounting piece 74b, and the sensor mounting piece 74a is fixed by bolts 77 supported movably along a dovetail groove 73a of the second movable member 73. When the bolts 77 are loosened, the bracket 74 moves along the dovetail groove 73a in the widthwise direction of the transfer film 20 with respect to the second movable member 73.

The light emitter 33 and the light detector 34 are mounted on the sensor mounting piece 74b of each of the bracket 74, and a pair of guides 78 that facilitate the insertion of the transfer film 20 between the light emitter 33 and the light detector 34 are provided.

Regarding the attachment structure of the sensors shown in FIGS. 10 and 11, since the attaching positions of the lengthwise direction sensor 30 and the first and second widthwise direction sensors 31, 32 are different from one another, two structures that are horizontally symmetric are provided, out of which the one shown in FIG. 11 is for attaching the first widthwise direction sensor 31, while the other for attaching the lengthwise direction sensor 30 and the second widthwise direction sensor 32 has a structure horizontally symmetrical with that of FIG. 11.

Figure 12:
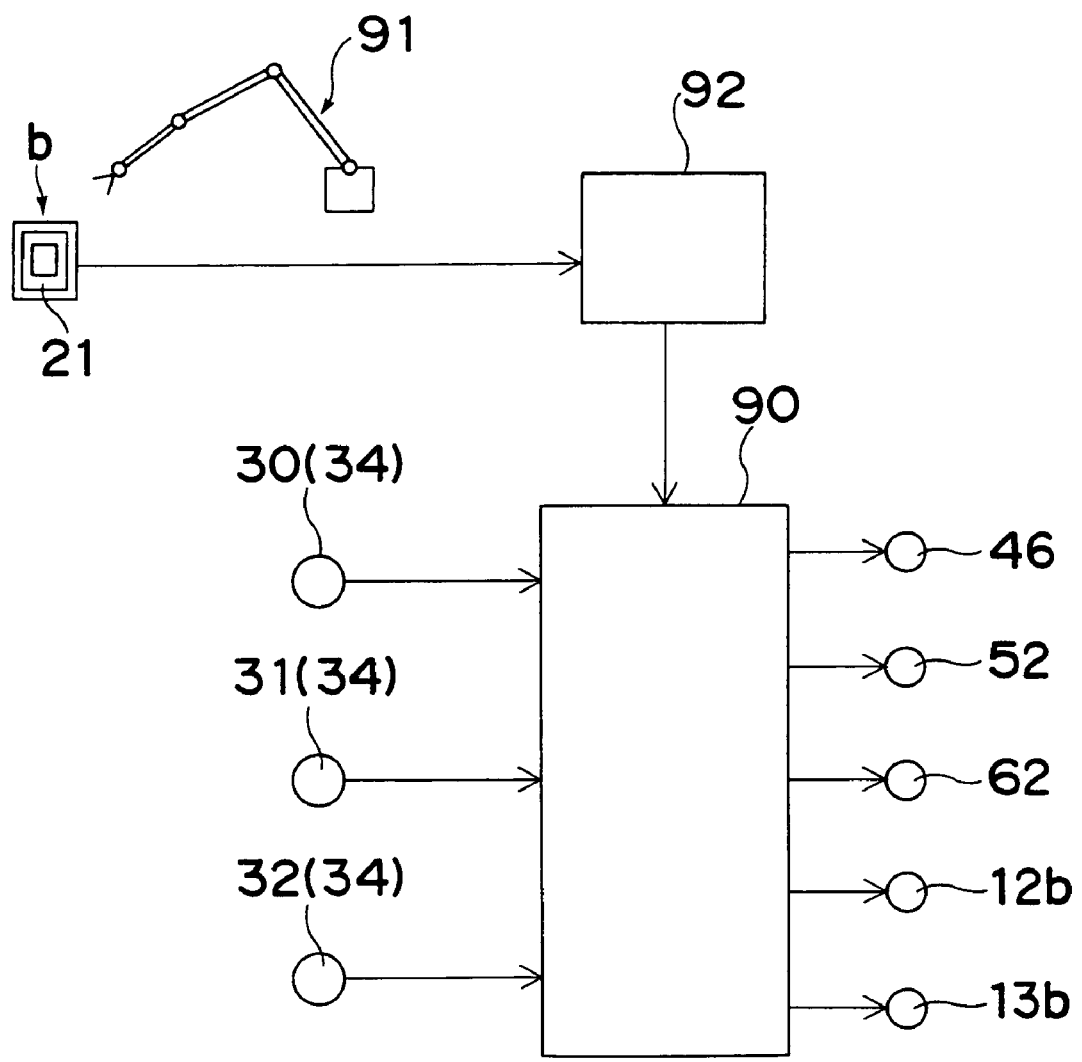
FIG. 12 is a circuit diagram of a control circuit included in the transferring and molding apparatus of FIG. 1.

Hereunder, the control of the transferring and molding apparatus constituted as above will be described. The transferring and molding apparatus shown in FIG. 1 is driven under the control of a control mechanism. As shown in FIG. 12, the driving mechanism includes a controller 90, which receives an output signal including information on the amount of received light from the respective light detectors 34 of the lengthwise direction sensor 30 and the first and the second widthwise direction sensors 31 and 32.

The controller 90 calculates the amounts of shift between the marks 22, 23 and the respective sensors 30, 31, 32 on the basis of the inputted quantities of received light, detects the transfer position (shift dimension at the time of transfer) of the transfer film 20 as digital values and stores the values.

The molded article "b", onto which the pattern 21 has been transferred, is conveyed to the outside of the molding section of the dies by a robot arm 91. Subsequently, the shift dimensions $L_1$ and $H_1$ and the shift direction of the pattern 21 of the molded article are detected as digital values in an image recognition unit 92, and the detected shift dimensions $L_1$ and $H_1$ and the shift direction are inputted to the controller 90. This operation is carried out at any time. The operation is carried out, for example, every 500 times of molding.

The controller 90 determines the necessity of positional correction of the transfer film 20 on the basis of the inputted shift dimensions.

When the controller 90 determines that the positional correction is required to be carried out by moving the transfer film 20 in the lengthwise direction, and then the positional correction is carried out by moving the transfer film 20 in the direction opposite from the shift direction in the lengthwise direction by controlling the driving of the first, second and third motors 46, 52 and 62 on the basis of the lengthwise direction shift dimension $L_1$ and the shift direction.

The lengthwise direction sensor 30 monitors the lengthwise position of the transfer film 20 based on variation of the amount of light received by the lengthwise direction sensor 30, simultaneously with the movement of the transfer film 20, and once the controller 90 detects that the transfer film 20 has come to the position where the lengthwise direction shift dimension $L_1$ can be corrected, then the first, second and third motors 46, 52 and 62 are stopped so as to stop the transfer film.

By this operation, the positional correction in the lengthwise direction of the transfer film 20 is completed.

If the controller 90 determines that the positional correction is required to be carried out by moving the transfer film 20 in the widthwise direction, then the transfer film 20 is moved in the direction opposite from the shift direction in the widthwise direction by controlling the driving of the motors 12b and 13b of the first and second movement mechanisms 12 and 13 on the basis of the widthwise direction shift dimension $H_1$ and the shift direction.

Simultaneously with this operation, the first and second widthwise direction sensors 31 and 32 monitor the widthwise position of the transfer film similarly to the aforementioned case, based on a variation of the quantity of light received, and once the controller 90 detects that the transfer film 20 has come to the position where the widthwise direction shift dimension $H_1$ can be corrected, the motors 12b and 13b are stopped.

By this operation, the positional correction in the widthwise direction of the transfer film 20 is completed.

If the positional correction of the transfer film 20 ends as described above, then the transferring and molding operation is carried out several times. The operation is carried out, for example, six times. Subsequently, the molded article is conveyed to the image recognition unit 92 similarly to the aforementioned operation, and the shift dimension and direction of the pattern 21 of the molded article are detected again and inputted into the controller 90.

If the controller 90 determines that positional correction is required to be carried out, the aforementioned positional correction operation is carried out again.

In this case, there is detected a difference between the shift dimension of the pattern 21 of the molded article "b" that has undergone the transferring and molding before the positional correction of the transfer film 20 and the shift dimension of the pattern 21 of the molded article "b" that has undergone the transferring and molding after the positional correction of the transfer film 20.

Then, the transfer film 20 is moved by this difference. For example, if the quantity of movement of the transfer film 20 detected as described above coincides with the aforementioned difference, then the motors 44, 52, 65, 12b, 13b are stopped.

If the controller 90 determines that there is no need to carry out the positional correction by repeating this operation, then the normal transferring and molding operation is carried out.

The determination of the positional correction in this description is made depending on whether or not the aforementioned shift dimension of the pattern 21 of the molded article is within the tolerance range.

In the case where there is a difference between the widthwise direction shift dimension $H_2$ on the forward side in the lengthwise direction and the widthwise direction shift dimension $H_3$ on the rearward side in the lengthwise direction as shown in FIG. 6C, the pattern 21 is transferred aslant onto the molded article "b". Therefore, the motor 12b of the first movement mechanism 12 and the motor 13b of the second movement mechanism 13 are independently driven, and the positional correction is carried out by moving the forward side and the rearward side in the lengthwise direction of the transfer film 20 in the opposite direction in the widthwise direction.

In the above description, the operation of moving the transfer film 20 for the positional correction may be carried out after moving the transfer film 20 to the transfer position as usual or before moving the transfer film 20 to the transfer position.

Further, in this embodiment, since a tension of the transfer film 20 is adjusted by controlling the braking force of the feed reel 44 and the driving force of the driving roller 50, servo motors are employed as the first and the second motors 46, 52. For the winding reel 61, an induction motor is employed since the winding reel 61 only serves to collect the used transfer film 20. Also, when the film winding diameter on the winding reel becomes larger, it does not affect the tension of the transfer film 20 between the feed reel 44 (film feeding unit 10) and the driving roller 50 (film tension mechanism 14).

It is to be understood that the present invention is not limited to the foregoing embodiments, but various modifications may be made.

To cite a few examples, while the protruding direction of the marks is detected by the sensors 30, 31, 32, and historic records of the shielding ratio are kept during the movement of the transfer film for detecting the position and the shift direction of the transfer film in the foregoing embodiments, alternatively two light emitters and light detectors may be provided to one sensor at different positions, so that the shift direction can be detected by comparison of the shielding ratio of the two light detectors.

Also, the detection of the pattern shift on the molded article by the pattern detection section may be performed at a desired frequency, and such detection frequency may be appropriately changed according to the molding condition. For example, after executing the positional correction of the transfer film, the pattern shift detection may be performed at a higher frequency, and then less frequently with the lapse of time.

Further, the information obtained through detection of the pattern shift on the molded article by the pattern detection section may be stored, and an average value of the accumulated information values may be calculated when a predetermined condition is satisfied, for example when a predetermined amount of information has been accumulated or when a predetermined time has elapsed, so as to execute the positional correction of the transfer film based on the average value obtained. Executing the positional correction based on the average value allows correcting the pattern shift at high accuracy over an entirety of the successive transferring and molding process. In other words, since the transfer position of the pattern is only slightly different among the molded articles produced through the successive transferring and molding process, it is effective to store the first digital value and to perform the positional correction of the transfer film based on an average value thereof, to thus correct the position shift of the pattern with high accuracy over an entirety of the successive transferring and molding process.

In addition, regarding the film winding unit 11, the film winding mechanism 15 may be disposed so as to be moved in the widthwise direction of the transfer film by the second movement mechanism.

By properly combining any selected embodiments out of the aforementioned various embodiments, the advantageous effects appropriate to the respective embodiments can be equally attained.

Although the present invention has been fully described in connection with the preferred embodiments thereof with reference to the accompanying drawings, it is to be noted that various changes and modifications are apparent to those skilled in the art. Such changes and modifications are to be understood as included within the scope of the present invention as defined by the appended claims unless they depart therefrom.

The invention claimed is:

1. A transferring and molding method comprising:
    executing transferring and molding by positioning a transfer position of a transfer film by moving the transfer film in a lengthwise direction of the transfer film that has a pattern and at least one of a lengthwise direction mark and a widthwise direction mark, holding the transfer film between a stationary die and a movable die, and transferring the pattern onto a molded article concurrently with injection molding of a molten resin into a cavity located between both the dies closed with respect to each other for forming the molded article;
    obtaining a first digital value by detecting a shift dimension and a shift direction of the pattern of the molded article that has undergone the transferring and molding;
    obtaining an amount of shift of the mark in a form of a second digital value;
    obtaining a correction value and direction for correcting a transfer position of the transfer film, from both the first and second digital values; and
    carrying out correction with film movement of the transfer film based on the correction value and direction.

2. The transferring and molding method according to claim 1,
    wherein obtaining the second digital value includes utilizing a laser line sensor for detection, and obtaining position information of the transfer film located in the transfer position, according to a shielding ratio of the mark provided on the transfer film located in the transfer position with respect to the laser line sensor; and
    obtaining the correction value and direction includes calculating the shielding ratio of the mark provided on the transfer film located on a presumed position where the transfer film is to be located after the correction, with respect to the laser line sensor.

3. The transferring and molding method according to claim 1,
    Wherein obtaining the first digital value includes generating an image of the molded article, and obtaining based on the image the shift amount and the shift direction between the actual position of the pattern transferred onto the molded article and a reference position where the pattern is supposed to be.

4. The transferring and molding method as claimed in claim 1, further comprising:
    executing, after the correction, transferring and molding by positioning another transfer position of the transfer film by moving the transfer film in the lengthwise direction of the transfer film, holding the transfer film between the stationary die and the movable die, and transferring the pattern onto another molded article concurrently with injection molding of the molten resin into the cavity of both the dies closed with respect to each other for forming the another molded article;
    obtaining a third digital value by detecting again a shift dimension and a shift direction of the pattern of the another molded article that has undergone the transferring and molding;
    when the detected third digital value is outside a preset tolerance range, obtaining an amount of shift of the mark in a form of a fourth digital value;
    obtaining a correction value and direction for correcting a transfer position of the transfer film, from both the third and fourth digital values; and
    repeating the correction and the transferring and molding until the third digital value falls within the tolerance range.

5. A transferring and molding apparatus comprising:
    an injection molding section for executing a transferring and molding operation by putting a stationary die and a movable die into a die closed state and a die open state and for injecting a molten resin into a cavity of both the dies in the die closed state to form a molded article concurrently with transferring onto the molded article a pattern of a transfer film which has the pattern to be transferred onto the molded article and at least one of a lengthwise direction mark and a widthwise direction mark;
    a transfer film moving section for moving and positioning the transfer film in a lengthwise direction thereof with respect to a die parting surface of the die of the injection molding section before the transferring and molding operation and for moving the transfer film in at least one of the lengthwise direction and a widthwise direction of the transfer film during positional correction;
    a pattern detection section for obtaining a first digital value by detecting a shift dimension and a shift direction of the pattern of the molded article that has undergone the transferring and molding operation; and
    a sensor section for obtaining an amount of shift of the mark in a form of a second digital value,
    wherein the transfer film is moved in at least one of a lengthwise direction and a widthwise direction of the transfer film by the transfer film moving section based on a correction value and direction which are obtained from both the first and second digital values.

6. The transferring and molding apparatus according to claim 5, wherein the transfer film moving section includes a film feeding unit that feeds the transfer film in a lengthwise direction thereof into between the stationary die and the movable die, a film winding unit that winds thereon the transfer film delivered from the film feeding unit, a first moving mechanism that movably supports the film feeding unit in a widthwise direction of the transfer film, and a second moving mechanism that movably supports the film winding unit in a widthwise direction of the transfer film.

7. The transferring and molding apparatus according to claim 5, wherein the sensor section includes a laser line sensor, so as to detect a shielding ratio of the mark provided on the transfer film located in the transfer position with respect to the laser line sensor and to thereby obtain the second digital value representing the position information of the transfer film located on the transfer position, and the correction value and direction is obtained in a form of the shielding ratio of the mark provided on the transfer film located on a presumed position where the transfer film is to be located after the correction, with respect to the laser line sensor.

8. The transferring and molding apparatus according to claim 5, wherein the pattern detection section generates an image of the molded article, and obtains based on the image the shift amount and the shift direction between the actual position of the pattern transferred onto the molded article and a reference position where the pattern is supposed to be.

9. The transferring and molding apparatus according to claim 5,
wherein the injection molding section moves, after the correction, the transfer film in a lengthwise direction thereof to determine another transfer position, and injects the molten resin into the cavity defined by the stationary die and the movable die closed with respect to each other with the transfer film held therebetween, so as to transfer the pattern onto another molded article concurrently with the molding;
the pattern detection section detects a shift dimension and shift direction of the pattern of another molded article that has undergone the transferring and molding process so as to obtain a third digital value;
the sensor section obtains a fourth digital value representing the shift amount of the mark, when the detected third digital value falls outside a predetermined tolerance range; and
the transfer film moving section repetitively moves the transfer film for correction until the third digital value falls inside the tolerance range, based on the correction value and direction, with respect to the transfer position of the transfer film obtained from the third and the fourth digital values.

10. The transferring and molding apparatus according to claim 5, further comprising:
a storage unit that stores a plurality of first digital values obtained from a plurality of detections of the shift dimension and the shift direction performed by the pattern detection section; and
an average calculation section that calculates the average value of the plurality of first digital values stored in the storage unit;

wherein the transfer film is moved based on the correction value and direction with respect to the transfer position of the transfer film obtained from the average value and the second digital value.

11. The transferring and molding method as claimed in claim 2, further comprising:
executing, after the correction, transferring and molding by positioning another transfer position of the transfer film by moving the transfer film in the lengthwise direction of the transfer film, holding the transfer film between the stationary die and the movable die, and transferring the pattern onto another molded article concurrently with injection molding of the molten resin into the cavity of both the dies closed with respect to each other for forming the another molded article;
obtaining a third digital value by detecting again a shift dimension and a shift direction of the pattern of the another molded article that has undergone the transferring and molding;
when the detected third digital value is outside a preset tolerance range, obtaining an amount of shift of the mark in a form of a fourth digital value;
obtaining a correction value and direction for correcting a transfer position of the transfer film, from both the third and fourth digital values; and
repeating the correction and the transferring and molding until the third digital value falls within the tolerance range.

12. The transferring and molding method as claimed in claim 3, further comprising:
executing, after the correction, transferring and molding by positioning another transfer position of the transfer film by moving the transfer film in the lengthwise direction of the transfer film, holding the transfer film between the stationary die and the movable die, and transferring the pattern onto another molded article concurrently with injection molding of the molten resin into the cavity of both the dies closed with respect to each other for forming the another molded article;
obtaining a third digital value by detecting again a shift dimension and a shift direction of the pattern of the another molded article that has undergone the transferring and molding;
when the detected third digital value is outside a preset tolerance range, obtaining an amount of shift of the mark in a form of a fourth digital value;
obtaining a correction value and direction for correcting a transfer position of the transfer film, from both the third and fourth digital values; and
repeating the correction and the transferring and molding until the third digital value falls within the tolerance range.

13. The transferring and molding apparatus according to claim 6,
wherein the injection molding section moves, after the correction, the transfer film in a lengthwise direction thereof to determine another transfer position, and injects the molten resin into the cavity defined by the stationary die and the movable die closed with respect to each other with the transfer film held therebetween, so as to transfer the pattern onto another molded article concurrently with the molding;
the pattern detection section detects a shift dimension and shift direction of the pattern of another molded article that has undergone the transferring and molding process so as to obtain a third digital value;

the sensor section obtains a fourth digital value representing the shift amount of the mark, when the detected third digital value falls outside a predetermined tolerance range; and the transfer film moving section repetitively moves the transfer film for correction until the third digital value falls inside the tolerance range, based on the correction value and direction, with respect to the transfer position of the transfer film obtained from the third and the fourth digital values.

14. The transferring and molding apparatus according to claim 7, wherein the injection molding section moves, after the correction, the transfer film in a lengthwise direction thereof to determine another transfer position, and injects the molten resin into the cavity defined by the stationary die and the movable die closed to each other with the transfer film held therebetween, so as to transfer the pattern onto another molded article concurrently with the molding;

the pattern detection section detects a shift dimension and shift direction of the pattern of another molded article that has undergone the transferring and molding process so as to obtain a third digital value;

the sensor section obtains a fourth digital value representing the shift amount of the mark, when the detected third digital value falls outside a predetermined tolerance range; and the transfer film moving section repetitively moves the transfer film for correction until the third digital value falls inside the tolerance range, based on the correction value and direction, with respect to the transfer position of the transfer film obtained from the third and the fourth digital values.

15. The transferring and molding apparatus according to claim 8, wherein the injection molding section moves, after the correction, the transfer film in a lengthwise direction thereof to determine another transfer position, and injects the molten resin into the cavity defined by the stationary die and the movable die closed with respect to each other with the transfer film held therebetween, so as to transfer the pattern onto another molded article concurrently with the molding;

the pattern detection section detects a shift dimension and shift direction of the pattern of another molded article that has undergone the transferring and molding process so as to obtain a third digital value;

the sensor section obtains a fourth digital value representing the shift amount of the mark, when the detected third digital value falls outside a predetermined tolerance range; and the transfer film moving section repetitively moves the transfer film for correction until the third digital value falls inside the tolerance range, based on the correction value and direction, with respect to the transfer position of the transfer film obtained from the third and the fourth digital values.

* * * * *